(12) United States Patent
Shioda et al.

(10) Patent No.: US 7,403,905 B2
(45) Date of Patent: Jul. 22, 2008

(54) ADVERTISEMENT INFORMATION PROVIDING SYSTEM

(75) Inventors: Takehiko Shioda, Saitama (JP); Yukitaka Saito, Saitama (JP); Hiroaki Shibasaki, Tokyo (JP); Masae Shimada, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1304 days.

(21) Appl. No.: 10/006,646

(22) Filed: Dec. 10, 2001

(65) Prior Publication Data

US 2002/0077910 A1 Jun. 20, 2002

(30) Foreign Application Priority Data

Dec. 15, 2000 (JP) .......................... P. 2000-382793
Aug. 7, 2001 (JP) .......................... P. 2001-239119

(51) Int. Cl.
G06Q 30/00 (2006.01)
(52) U.S. Cl. ....................... 705/14; 455/456.3
(58) Field of Classification Search .................. 705/14; 455/456.3
See application file for complete search history.

(56) References Cited

U.S. PATENT DOCUMENTS 6,098,048 A * 8/2000 Dashefsky et al. ............ 705/10
6,317,718 B1 * 11/2001 Fano ............................. 705/1
6,332,127 B1 * 12/2001 Bandera et al. ............... 705/14
6,587,835 B1 * 7/2003 Treyz et al. .................... 705/14
6,912,398 B1 * 6/2005 Domnitz ..................... 455/461
6,965,868 B1 * 11/2005 Bednarek ....................... 705/9
2002/0107027 A1 * 8/2002 O'Neil ......................... 455/456
2005/0177416 A1 * 8/2005 Linden ......................... 705/14
2005/0227709 A1 * 10/2005 Chang et al. .............. 455/456.1

FOREIGN PATENT DOCUMENTS

WO     WO 98/38589    * 9/1998
WO     WO 00/70504    * 11/2000

OTHER PUBLICATIONS

"Lucent Technologies and Profilium Inc. Announce Alliance Agreement to Deploy Advanced Location-Based Mobile Advertising Solution". Business Wire. Jan. 23, 2001.*

* cited by examiner

Primary Examiner—Eric Stamber
Assistant Examiner—Michael Bekerman
(74) Attorney, Agent, or Firm—Sughrue Mion, PLLC

(57) ABSTRACT

In an advertisement information providing system, a destination is set based on the identification number assigned for each store 10, published by an advertisement provider 20. When the user arrives at the setup destination and visits the corresponding store 10 or purchases a commodity in the store 10, the store 10 pays cooperation money to the advertisement provider 20.

25 Claims, 22 Drawing Sheets

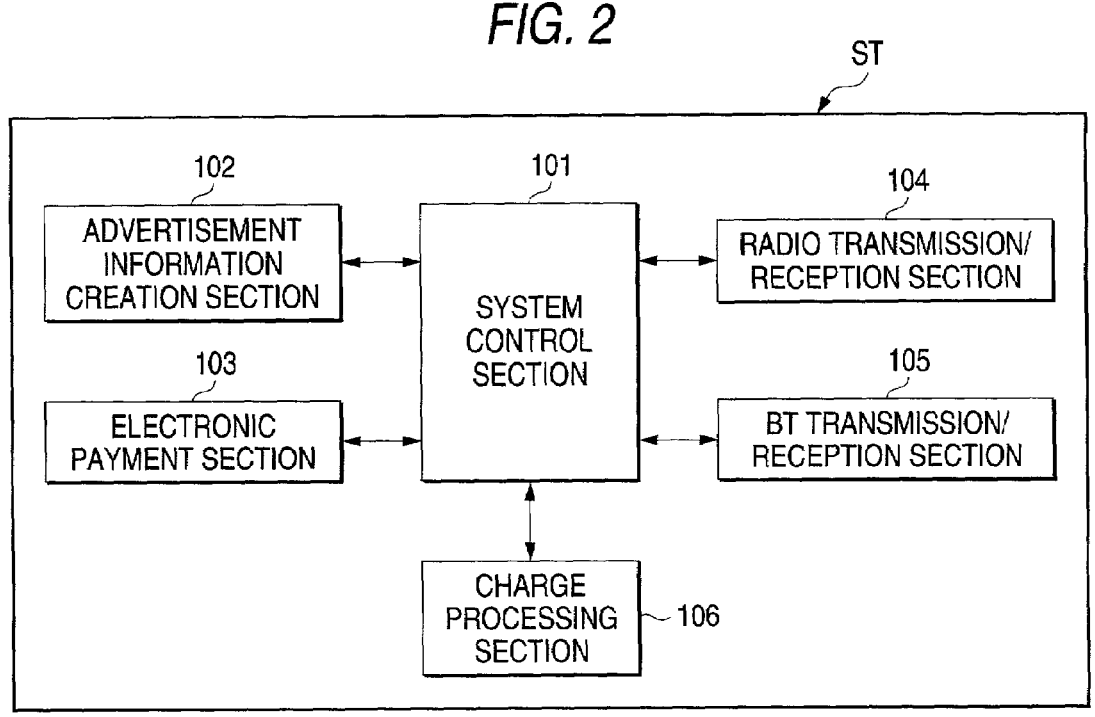
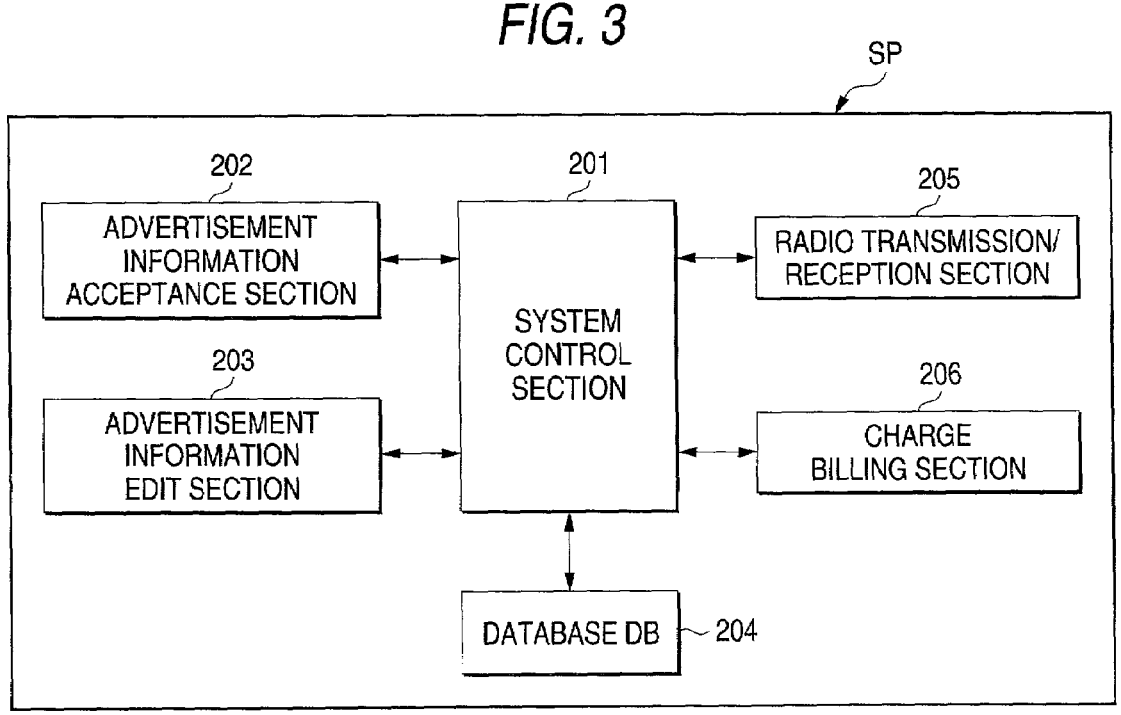

FIG. 5 (a) INFORMATION PROVIDING MAGAZINE 21A

| STORE NUMBER | STORE CATEGORY | STORE INFORMATION | SIMPLE MAP | IDENTIFICATION NUMBER |
|---|---|---|---|---|
| 10A | CHINESE NOODLE RESTAURANT | STORE NAME: XX<br>BUSINESS HOURS: XX<br>PRICE: XX | ······· | 20A001001 |
| 10B | TAILOR | STORE NAME: XX<br>BUSINESS HOURS: XX<br>ADVERTISEMENT INFORMATION: XX | ······· | 20A005010 |
| 10C | ELECTRICAL STORE | STORE NAME: XX<br>BUSINESS HOURS: XX<br>ADVANTAGEOUS PURCHASE INFORMATION: XX | ······· | 20A020010 |
| ⋮ | ⋮ | ⋮ | ⋮ | ⋮ |

FIG. 5 (b) INFORMATION PROVIDING MAGAZINE 21B

| STORE NUMBER | STORE CATEGORY | STORE INFORMATION | SIMPLE MAP | IDENTIFICATION NUMBER |
|---|---|---|---|---|
| 10A | CHINESE NOODLE RESTAURANT | STORE NAME: XX<br>BUSINESS HOURS: XX<br>PRICE: XX | ······· | 20B001001 |
| 10D | ELECTRICAL STORE | STORE NAME: XX<br>BUSINESS HOURS: XX<br>ADVANTAGEOUS PURCHASE INFORMATION: XX | ······· | 20B020010 |
| ⋮ | ⋮ | ⋮ | ⋮ | ⋮ |
| ⋮ | ⋮ | ⋮ | ⋮ | ⋮ |

FIG. 5 (c) INFORMATION PROVIDING MAGAZINE 21C

| STORE NUMBER | STORE CATEGORY | STORE INFORMATION | SIMPLE MAP | IDENTIFICATION NUMBER |
|---|---|---|---|---|
| 10G | CHINESE NOODLE RESTAURANT | STORE NAME: XX<br>BUSINESS HOURS: XX<br>PRICE: XX | ······· | 20C001001 |
| 10BH | ELECTRICAL STORE | STORE NAME: XX<br>BUSINESS HOURS: XX<br>ADVANTAGEOUS PURCHASE INFORMATION: XX | ······· | 20C020010 |
| ⋮ | ⋮ | ⋮ | ⋮ | ⋮ |

ADVERTISEMENT INFORMATION PROVIDING SYSTEM

BACKGROUND OF THE INVENTION

1. Field of the Invention

This invention relates to an advertisement information providing system including a store, an advertisement provider, and an information terminal owned by the user.

2. Description of the Related Art

To attract customers, a general store, a commercial installation, a tourist installation, etc. pay a predetermined advertisement charge to a publisher publishing a map information magazine, etc., so as to advertise the store, etc., in the map information magazine, etc. Recently, a vehicle-installed or portable navigation system in which position information of a store, etc., is registered and can be referenced by the user to determine the destination or the route has become widespread.

However, although a store or a tourist installation pays a comparatively high advertisement charge for publishing an advertisement, whether or not the user sees the advertisement and visits the stores or the tourist installation cannot be known and therefore means for knowing the advertisement effect of attracting customers responsive to the advertisement is not available. In the navigation system, it is also considered that advertisement information together with the position information of a store, etc., is displayed for producing the effect of attracting customers. In such a system, however, hitherto an appropriate advertisement information providing system has not been available. That is, thioester, etc., cannot easily check or keep track of the advertisement effect of attracting customers responsive to the advertisement; this is a problem.

The user uses the navigation system to set the destination; with almost all types of current navigation systems, the user points to the destination directly on a map appearing on a display screen or enters the address or the telephone number of the destination, and the input operation is burdensome. Further, the publisher or advertisement agency wants to set a high advertisement charge to obtain a profit, but the price of the information magazine itself needs to be lowered to enhance the purchasing power of the user.

It is therefore an object of the invention to provide an information terminal and an advertisement information providing system for making it possible for the advertisement client of a store, etc., to easily know the advertisement effect of attracting customers to the advertisement object.

It is another object of the invention to provide an information terminal and an advertisement information providing system for making it possible to bill and pay the expense responsive to the advertisement effect and to carry an advertisement with excellent cost effectiveness.

To solve the problems described above, according to the invention, there is provided an advertisement information providing system comprising an advertisement providing apparatus for collectively managing advertisement information requested by stores to be carried, with an identification number assigned for each of the stores, and a navigation terminal for guiding a mobile unit, characterized in that the advertisement providing apparatus comprises providing means for providing the advertisement information for the user and reception means for receiving a signal sent from the navigation terminal, and that the navigation terminal comprises an input section for inputting the advertisement information, a guide section for guiding a mobile unit to the corresponding store based on the advertisement information, and a transmitter for sending an arrival notification signal to the advertisement providing apparatus when the mobile unit arrives at a point in a predetermined area containing the store.

The invention is characterized by the fact that in the advertisement information providing system, the identification number in the advertisement information contains geometrical position information of the store.

The invention is characterized by the fact that in the advertisement information providing system, the navigation terminal further comprises an extraction section for extracting the geometrical position information from the advertisement information, and the guide section guides the mobile unit based on the geometrical position information extracted by the extraction section.

The invention is characterized by the fact that in the advertisement information providing system, the identification number in the advertisement information contains a code number assigned uniquely to the advertisement providing apparatus.

The invention is characterized by the fact that in the advertisement information providing system, the navigation terminal further comprises an extraction section for extracting the code number from the advertisement information, and the transmitter sends the arrival notification signal to the advertisement providing apparatus corresponding to the extracted code number based on the code number.

The invention is characterized by the fact that in the advertisement information providing system, the providing means contained in the advertisement providing apparatus is a paper medium.

The invention is characterized by the fact that in the advertisement information providing system, the providing means contained in the advertisement providing apparatus is an advertisement information terminal storing the advertisement information.

The invention is characterized by the fact that the advertisement information providing system further comprises a portable information terminal through which the advertisement information can be input, the portable information terminal comprising an acquisition section for acquiring the advertisement information from the advertisement information terminal and transmission means for transmitting the advertisement information to the navigation terminal.

The invention is characterized by the fact that the advertisement information providing system further comprises store equipment managed by each of the stores, wherein the store equipment comprises electronic payment means and transmission means, wherein the portable information terminal comprises electronic payment means, and wherein when the electronic payment means contained in the store equipment and the electronic payment means contained in the portable information terminal communicate with each other for conducting electronic payment, the transmission means of the store equipment or that of the portable information terminal sends a purchase notification signal to the advertisement providing apparatus.

The invention is characterized by the fact that the advertisement information providing system further comprises store equipment managed by each of the stores, wherein the advertisement providing apparatus comprises cooperation money billing means, wherein the store equipment comprises charge processing means, wherein when receiving the arrival notification signal, the advertisement providing apparatus bills cooperation money for the store, and wherein the store equipment performs charge processing as the cooperation money is billed.

To solve the problems described above, according to the invention, there is provided a navigation terminal for guiding a mobile unit based on advertisement information published by an advertisement providing apparatus for collectively managing the advertisement information requested by stores to be carried, with an identification number assigned for each of the stores, the navigation terminal comprising an input section for inputting the advertisement information, a guide section for guiding a mobile unit to the corresponding store based on the advertisement information, and a transmitter for sending an arrival notification signal to the advertisement providing apparatus when the mobile unit arrives at a point in a predetermined area containing the store.

The invention is characterized by the fact that in the navigation terminal, only the identification number assigned in the advertisement information can be input through the input section.

The invention is characterized by the fact that the navigation terminal further comprises an extraction section for extracting the geometrical position information from the identification number, wherein the guide section guides the mobile unit based on the geometrical position information in the identification number.

The invention is characterized by the fact that the navigation terminal further comprises an extraction section for extracting the geometrical position information from the advertisement information, wherein the guide section guides the mobile unit based on the geometrical position information in the identification number.

To solve the problems described above, according to the invention, there is provided an advertisement information terminal contained in an advertisement providing apparatus for collectively managing advertisement information requested by stores to be carried, the advertisement information terminal comprising database storage means for adding an identification number assigned for each of the stores and containing geometrical position information of the store to the advertisement information for storage, selection means for selecting the advertisement information, and transmission means for transmitting the selected advertisement information.

The invention is characterized by the fact that in the advertisement information terminal, the identification number is a number that can be recognized as destination information in a navigation terminal.

To solve the problems described above, according to the invention, there is provided a record medium storing a program for causing a navigation terminal to execute a guiding step of guiding a mobile unit to a store based on identification information in advertisement information published by an advertisement providing apparatus for collectively managing the advertisement information requested by stores to be carried, with an identification number assigned for each of the stores, and a sending step of sending an arrival notification signal to the advertisement providing apparatus when the mobile unit arrives at a point in a predetermined area containing the store.

The invention is characterized by the fact that in the record medium, the program causes the navigation terminal to execute the additional step of terminating the program when the arrival notification signal is sent in the sending step.

To solve the problems described above, according to the invention, there is provided an advertisement information providing system comprising an advertisement providing apparatus for collectively managing advertisement information requested by stores to be carried, with an identification number assigned for each of the stores, communication common carrier equipment with base stations placed for each predetermined area, and a portable information terminal making a predetermined contract with the communication common carrier managing the communication common carrier equipment, characterized in that the advertisement providing apparatus comprises providing means for providing the advertisement information for the user and reception means for receiving a signal sent from the communication common carrier equipment, that the communication common carrier equipment comprises monitor means for monitoring the current position of the portable information terminal, reception means for receiving a signal from the portable information terminal, and a transmitter for sending an arrival notification signal to the advertisement providing apparatus when the portable information terminal arrives at a point in a predetermined area containing the store, and that the portable information terminal comprises an input section for inputting the advertisement information and transmission means for transmitting the advertisement information to the communication common carrier equipment.

The invention is characterized by the fact that in the advertisement information providing system, the identification number in the advertisement information contains geometrical position information of the store.

The invention is characterized by the fact that in the advertisement information providing system, the identification number in the advertisement information contains a code number assigned for each advertisement provider.

The invention is characterized by the fact that in the advertisement information providing system, when the advertisement information is input through the input section of the portable information terminal, the portable information terminal sends at least the identification number in the advertisement information to the communication common carrier by the transmission means.

The invention is characterized by the fact that in advertisement information providing system, the communication common carrier equipment further comprises an extraction section for extracting geometrical position information from the advertisement information transmitted from the portable information terminal, and comparison means for comparing the geometrical position information extracted by the extraction section with geometrical position information of the portable information terminal monitored by the monitor means, and the transmitter sends the arrival notification signal to the advertisement providing apparatus when the comparison means detects the portable information terminal arriving at a point in a predetermined area containing the store.

The invention is characterized by the fact that in the advertisement information providing system, when receiving the identification number from the portable information terminal, the communication common carrier equipment starts the comparison means.

The invention is characterized by the fact that in the advertisement information providing system, when the arrival notification signal is transmitted by the transmission means, the communication common carrier equipment terminates the monitoring of the monitor means.

To solve the problems described above, according to the invention, there is provided a communication common carrier server being connected in a communication-possible manner to an advertisement providing apparatus for collectively managing advertisement information requested by stores to be carried, with an identification number assigned for each of the stores, the communication common carrier server comprising monitor means for monitoring the current position of a portable information terminal, reception means for receiving a signal from the portable information terminal, determination means for determining whether or not the portable information terminal arrives at a point in a predetermined area containing the store, and a transmitter for sending an arrival notification signal to the advertisement providing apparatus.

The invention is characterized by the fact that in the communication common carrier server, when the reception means receives an identification number from the portable information terminal the monitor means starts monitoring.

The invention is characterized by the fact that in the communication common carrier server, when the determination means determines that the portable information terminal arrives at a point in the predetermined area containing the store, the transmitter sends the arrival notification signal to the advertisement providing apparatus.

To accomplish the objects, according to the invention, there is provided an information terminal used with an advertisement information providing system, the information terminal comprising a guide section for guiding a mobile into an advertisement object point based on provided advertisement information, and visit data transmission means, if the mobile arrives at a point in a predetermined range containing the advertisement object point as guided by the guide section, for transmitting visit data issued by the advertisement object to an advertisement providing apparatus distributing the advertisement information.

The information terminal further comprises advertisement showing means for displaying the provided advertisement information on a screen or guiding in a voice, and the visit data transmission means transmits advertisement providing data indicating that the corresponding advertisement information has been provided by the advertisement showing means to the advertisement providing apparatus together with the visit data.

The guide section sets a route based on the advertisement information and guides the mobile into the advertisement object point.

The visit data transmission means transmits position data when the mobile arrives at a point in the predetermined range containing the advertisement object point to the advertisement providing apparatus together with the visit data.

A portable memory card that can be attached to and detached from the information terminal for recording the visit data is used and when the memory card on which the visit data is recorded is attached to the information terminal, the visit data transmission means transmits the visit data to the advertisement providing apparatus.

The information terminal further comprises a data input section for entering an advertisement object code issued by the advertisement object as the visit data. When the advertisement object code is entered, the visit data transmission means transmits position data to the advertisement providing apparatus together with the advertisement object code.

To accomplish the objects, according to the invention, there is provided an advertisement information providing system comprising an advertisement providing apparatus for providing advertisement information and an information terminal for guiding a mobile into an advertisement object based on the provided advertisement information, characterized in that the advertisement providing apparatus comprises advertisement distribution means for distributing advertisement information and reception means for receiving a signal transmitted from the information terminal, and that the information terminal comprises a guide section for guiding the mobile into an advertisement object point based on the distributed advertisement information and visit data transmission means, if the mobile arrives at a point in a predetermined range containing the advertisement object point as guided by the guide section, for transmitting visit data issued by the advertisement object to the advertisement providing apparatus distributing the advertisement information.

The advertisement providing apparatus further comprises billing means for requesting an advertisement client of the advertisement object to pay an introduction fee if the advertisement providing apparatus receives the visit data from the information terminal.

The advertisement providing apparatus further comprises bonus giving means, if the advertisement providing apparatus receives the visit data from the information terminal, forgiving a bonus to the user of the information terminal as the user provides the visit data.

The advertisement information providing system further comprises advertisement client equipment managed by the advertisement client of the advertisement object, wherein the advertisement client equipment comprises visit data transmitter for sending the visit data to a portable memory card that can be attached to and detached from the information terminal for recording the visit data, and wherein when the memory card on which the visit data is recorded is attached to the information terminal, the visit data transmission means of the information terminal transmits the visit data to the advertisement providing apparatus.

The advertisement information providing system further comprises advertisement client equipment managed by the advertisement client of the advertisement object, wherein the advertisement client equipment comprises visit data issuing means for issuing an advertisement object code containing information concerning at least either of the advertisement object and the advertisement itself as the visit data, and wherein the information terminal further comprises a data input section for entering the issued advertisement object code.

To accomplish the objects, according to the invention, there is provided an advertisement information distribution apparatus of an advertisement providing apparatus used with an advertisement information providing system, the advertisement information distribution apparatus comprising advertisement distribution means for distributing advertisement information, reception means for receiving a signal transmitted from an information terminal for guiding a mobile into an advertisement object point based on the advertisement information, and bonus giving means, if visit data issued by the advertisement object is received from the information terminal, for giving a bonus to the user of the information terminal as the user provides the visit data.

The advertisement information distribution apparatus further comprises billing means for requesting the advertisement client of the advertisement object to pay an introduction fee if the visit data is received from the information terminal.

According to the invention, there is provided a program for causing a computer to be executed as means of an information terminal, an advertisement information providing system, or an advertisement information distribution apparatus as claimed in any of claims.

According to the configuration, the actual number of the persons visiting the advertisement object in response to the advertisement information can be known based on the visit data issued by the advertisement object indicating that each person sees the advertisement and visits the advertisement object, so that it is made possible for the advertisement client of a store, etc., to easily know the advertisement effect of attracting customers to the advertisement object. The advertisement providing data, the position data, and the like together with the visit data are transmitted, whereby it proves that reliably the user has seen the advertisement information and visited the advertisement object corresponding thereto, so that the reliability of the visit data can be enhanced.

As the visit data is transmitted and received, the advertisement provider requests the advertisement client to pay an introduction fee, whereby the expense responsive to the advertisement effect can be billed and paid and it is made possible to carry an advertisement with excellent cost effectiveness. Further, a bonus is given to the user of the information terminal as the user provides the visit data, whereby user's willingness to provide the visit data can be enhanced, so that the information of the advertisement effect in more conformity with the real state can be collected.

BRIEF DESCRIPTION OF THE DRAWINGS

FIG. 2 is a block diagram to show the detailed configuration of store equipment in the first embodiment of the invention.

FIG. 3 is a block diagram to show the detailed configuration of an advertisement providing apparatus in the first embodiment of the invention.

FIGS. 5A to 5C are views to show detailed formats of information providing magazines published by information providers in the first embodiment of the invention.

DETAILED DESCRIPTION OF THE PRESENT INVENTION

The present invention will be described with reference to the accompanying drawings. Described below are embodiments of the invention applied to an advertisement information providing system wherein an advertisement provider collectively manages the advertisement information of each store and a predetermined procedure is conducted when the general user who acquires the advertisement information of each store provided by the advertisement provider visits each store based on the advertisement information.

First Embodiment

Figure 1:
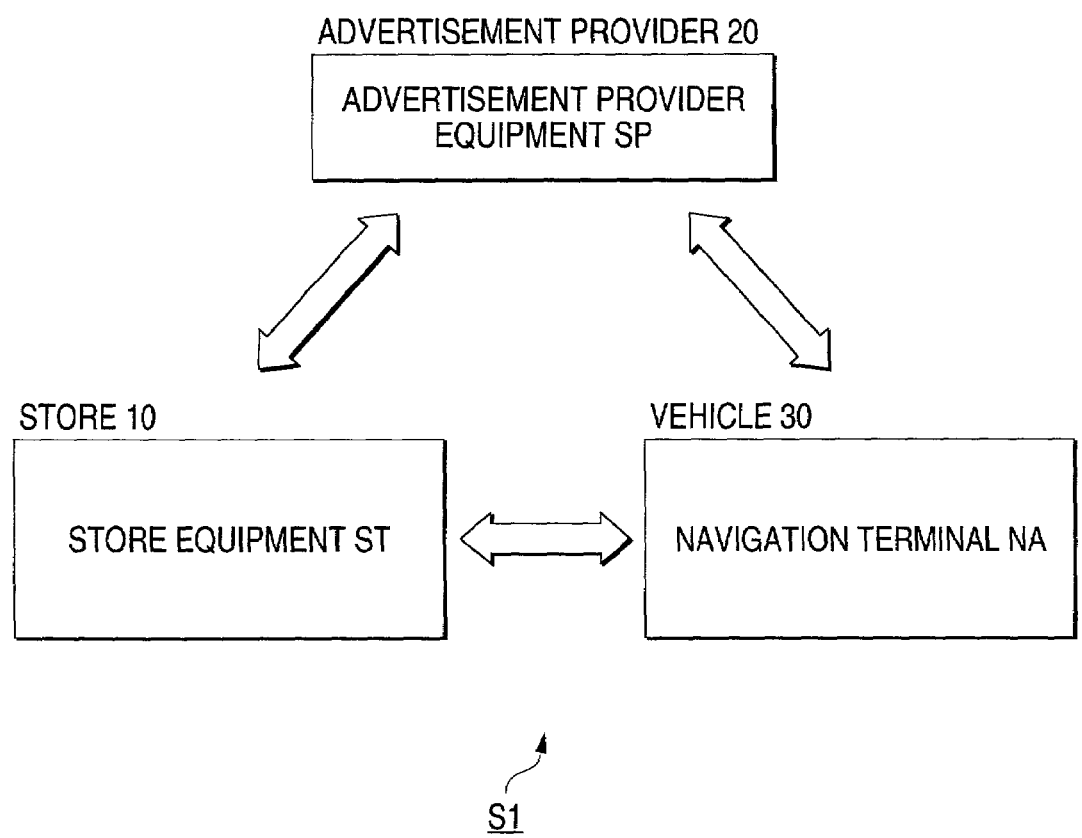
FIG. 1 is a block diagram to show the general configuration of an advertisement information providing system of a first embodiment of the invention.
Figure 4:
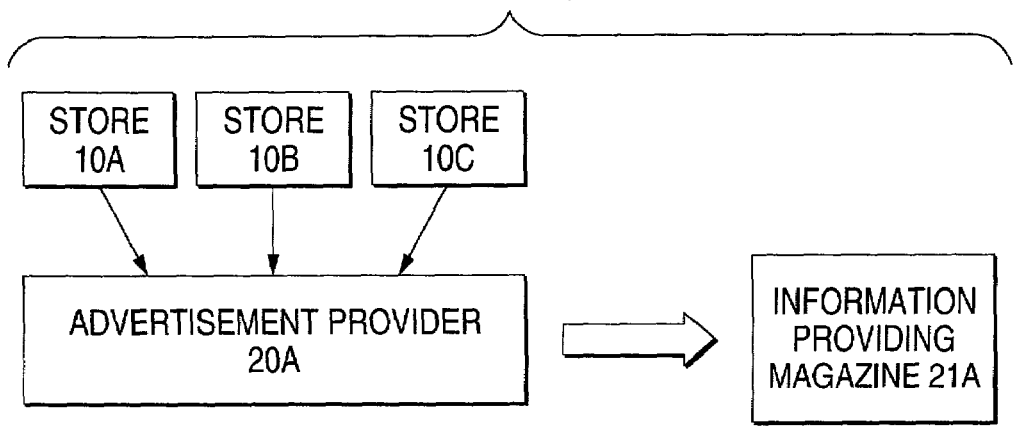
FIGS. 4A to 4C are views to show the relationship between a store and an advertisement provider in the first embodiment of the invention.
Figure 4:
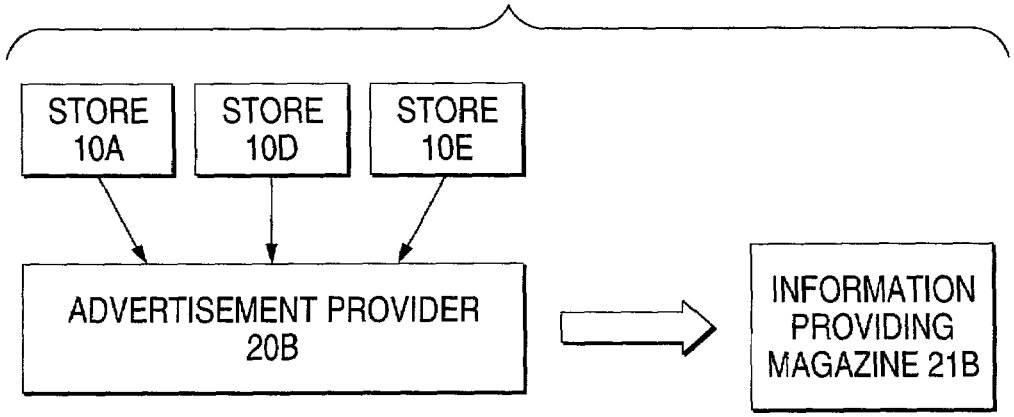
Figure 4:
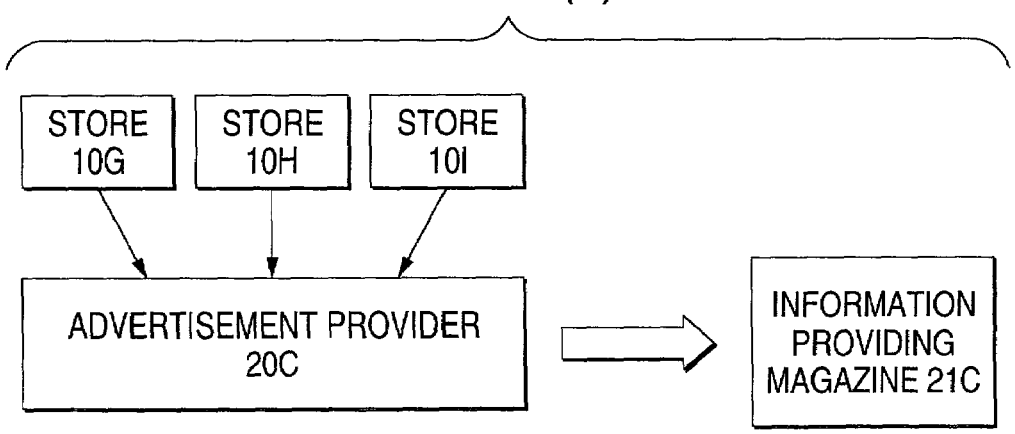

To begin with, a first embodiment of the invention will be described with reference to FIGS. 1 to 8. FIG. 1 is a block diagram to show the general configuration of an advertisement information providing system according to the first embodiment of the invention, FIGS. 2 to 7 are drawings to describe the detailed structures of blocks making up the advertisement information providing system, and FIG. 8 is an operation sequence chart to show information providing processing in the advertisement information providing system.

First, the general configuration and the operation of the advertisement information providing system according to the first embodiment will be discussed.

As shown in FIG. 1, the advertisement information providing system S1 of the first embodiment is made up of store equipment ST provided in a store 10, an advertisement providing apparatus SP provided in an advertisement provider 20, and a navigation terminal NA provided in a vehicle 30.

For simplicity, one store 10, one advertisement provider 20, and one vehicle 30 are shown in the figure, but the advertisement information providing system may comprise a plurality of stores, a plurality of advertisement providers, and a plurality of vehicles (navigation terminals) as in the embodiment described later.

The store 10 and the advertisement provider 20 have the relationship of supplying information to each other by wired or wireless means or any other means. The advertisement provider 20 and the navigation terminal NA provided in the vehicle 30 have the relationship where in the navigation terminal NA makes a route search according to destination information based on the identification number entered in an information providing magazine published by the advertisement provider 20. Predetermined program information (described later) issued by the advertisement provider 20 is installed in the navigation terminal NA.

The general operation is as follows:

In the described advertisement information providing system S1, the advertisement provider 20 publishes an information providing magazine carrying advertisement information of each store and the information providing magazine enters a predetermined identification number for each store. If the user who purchases the information providing magazine sets the identification number of the store entered in the information providing magazine in the navigation terminal NA, the navigation terminal NA recognizes the destination based on the identification number and guides the vehicle 30 based on the route search result. Then, when the vehicle 30 arrives at the store 10, the navigation terminal NA transmits an arrival notification signal indicating that the vehicle 30 arrives at the store 10 to the advertisement provider 20, which then collects cooperation money from the store 10 based on the arrival notification signal.

Next, the detailed configurations and the operation of the blocks making up the advertisement information providing system S1 of the first embodiment will be discussed with reference to FIGS. 2 to 7.

FIG. 2 is a block diagram to show the detailed configuration of the store equipment ST provided in the store 10.

The store equipment ST comprises a system control section 101 as the nucleus, an advertisement information creation section 102, an electronic payment processing section 103, a radio transmission/reception section 104, a Bluetooth transmission/reception section 105, and a charge processing section 106.

The advertisement information creation section 102 is a processing section for creating advertisement information of the store, for example, using a personal computer, etc. The advertisement information created in the advertisement information creation section 102 is transmitted to the advertisement provider 20. The advertisement information may be transmitted over a communication line or by mail.

Next, the electronic payment processing section 103 is used as a window of an electronic payment procedure conducted when the user purchases a commodity in the store; for example, electronic payment is made between the portable information terminal owned by the user and the electronic payment processing section 103.

Next, the radio transmission/reception section 104 transmits and receives a conversation signal of a portable information terminal and connects to the Internet, for example. It collectively transmits and receives a radio signal to and from the advertisement provider 20 and the navigation terminal NA or the portable information terminal owned by the user.

Next, the Bluetooth transmission/reception section 105 can transmit and receive a radio wave in a transmission system using a feeble radio wave of a 2.4-GHz band requiring no license and transmits and receives a radio wave to and from a Bluetooth transmission/reception section installed in another terminal.

Next, the charge processing section 106 pays a predetermined amount of money based on a cooperation money billing command from the advertisement providing apparatus SP.

FIG. 3 is a block diagram to show the detailed configuration of the advertisement providing apparatus SP provided in the advertisement provider 20.

The advertisement providing apparatus SP comprises a system control section 201 as the nucleus, an advertisement information acceptance section 202, an advertisement information edit section 203, a database DB 204, a radio transmission/reception section 205, and a charge billing section 206.

The advertisement information acceptance section 202 accepts advertisement information left by each store 10. The accepted advertisement information is transmitted to the advertisement information edit section 203. The advertisement information edit section 203 edits the advertisement information of each store 10 as an information providing magazine 21 (described later), one of means for providing the user with the advertisement information, and requests bookstores, convenience stores, etc., for example, to sell the information providing magazine 21.

Next, the database DB 204 collectively manages the advertisement information of each store 10 and provides a database for each store like a list in an information providing magazine shown below in FIGS. 5A to 5C. The database DB 204 is provided for the advertisement provider 20 to recognize the stores visited by the user based on the arrival notification signals from the navigation terminal NA; the format of the data base may be defined as desired for each information provider.

Next, the radio transmission/reception section 205 transmits and receives a conversation signal of a portable information terminal or a radio wave signal of Bluetooth, for example. It collectively transmits and receives a radio signal to and from the store 10 and the navigation terminal NA or the portable information terminal owned by the user.

Next, the charge billing section 206 is a processing section for billing the cooperation money for each store; it bills the cooperation money for the store visited by the user based on the arrival notification signal from the navigation terminal NA.

FIGS. 4A to 4C are views to show the relationship between the store 10 and the advertisement provider 20 in detail. As shown in FIG. 4A, a plurality of store A, store B, and store C request an advertisement provider 20A to publish the advertisement information of the stores.

That is, each of the stores 10A, 10B, and 10C pays a predetermined advertisement charge determined by the advertisement provider 20A, so that an information providing magazine 21A published by the advertisement provider 20A carries the information of the store. The advertisement provider 20A edits the advertisement information of the stores and then sells the information providing magazine 21A carrying the advertisement information of the stores.

Although described later, the advertisement information providing system S1 is a system wherein when the user purchasing the information providing magazine 21A visits the store carried in the information providing magazine 21A, the store pays the cooperation money to the advertisement provider 20A, so that it is made possible to determine the advertisement charge to be a comparatively low price.

That is, after selling the information providing magazine 21A, the advertisement provider 20A receives the cooperation money from the stores carried in the information providing magazine 21A and thus may set the advertisement charge to a low price. As the advertisement charge is set to a low price, the possibility that the advertisement provider 20A will be furthermore requested to carry advertisements by the stores also occurs.

Each of the stores 10A, 10B, and 10C may pay a low advertisement charge and pays the cooperation money to the advertisement provider 20A only if the user sees the information providing magazine 21A and visits the store, so that paying a fruitless advertisement charge is eliminated.

FIG. 4B shows the case where another advertisement provider 20B publishes an information providing magazine 21B.

In the figure, the store 10A, a store 10D, and a store 10E request the advertisement provider 20B to carry advertisements of the stores in the magazine 21B. Also in this case, when the user purchasing the information providing magazine 21B visits one of the stores carried in the information providing magazine 21B, the store pays the cooperation money to the advertisement provider 2DB.

Likewise, FIG. 4C shows the case where another advertisement provider 20C publishes an information providing magazine 21C. In the figure, a store 10G, a store 10H, and a store 101 request the advertisement provider 20C to carry advertisements of the stores in the magazine 21C. Also in this case, when the user purchasing the information providing magazine 21C visits one of the stores carried in the information providing magazine 21C, the store pays the cooperation money to the advertisement provider 20C.

The embodiment has been described by assuming that the stores request the information provider to carry advertisements in the magazine. However, the invention is not limited to it; advertisements of vacation installations such as amusement parks and zoos and tourist installations of lakes, waterfalls, etc., may be carried in the magazine. The advertisement provider 20 may issue not only a single information providing magazine, but also more than one information providing magazine.

FIGS. 5A to 5C show examples of lists of various pieces of advertisement information carried in information providing magazines.

FIG. 5A shows a list in the information providing magazine 21A published by the advertisement provider 20A; the list is made up of the entries of store number, store type, store information (store name, business hours, advantageous purchase information, etc.,), simple map, and identification number for each store. The store type, the store information (store name, business hours, advantageous purchase information, etc.,), and the simple map are information provided by each of the stores 10A, 10B, and 10C for the advertisement provider 20A and are edited by the advertisement provider 20A whenever necessary based on the provided information. The store number and the identification number are numbers added appropriately by the advertisement provider 20A. If the user sets the identification number as destination information of the navigation terminal, the store corresponding to the identification number is set as the destination and the vehicle is guided to the store. The identification number is described later.

FIG. 5B shows a list in the information providing magazine 21B published by the advertisement provider 20B; the list is made up of the entries of store number, store type, store information (store name, business hours, advantageous purchase information, etc.,), simple map, and identification number for each store. The store type, the store information (store name, business hours, advantageous purchase information, etc.,), and the simple map are information provided by each of the stores 10A and 10D for the advertisement provider 20B and are edited by the advertisement provider 20B whenever necessary based on the provided information. The store number and the identification number are numbers added appropriately by the advertisement provider 20B. If the user sets the identification number as destination information of the navigation terminal, the store corresponding to the identification number is set as the destination and the vehicle is guided to the store.

Likewise, FIG. 5C shows a list in the information providing magazine 21C published by the advertisement provider 20C; the list is made up of the entries of store number, store type, store information (store name, business hours, advantageous purchase information, etc.,), simple map, and identification number for each store. The store type, the store information (store name, business hours, advantageous purchase information, etc.,), and the simple map are information provided by each of the stores 10G and 10H for the advertisement provider 20C and are edited by the advertisement provider 20C whenever necessary based on the provided information. The store number and the identification number are numbers added appropriately by the advertisement provider 20C. If the user sets the identification number as destination information of the navigation terminal, the store corresponding to the identification number is set as the destination and the vehicle is guided to the store.

Figure 6:
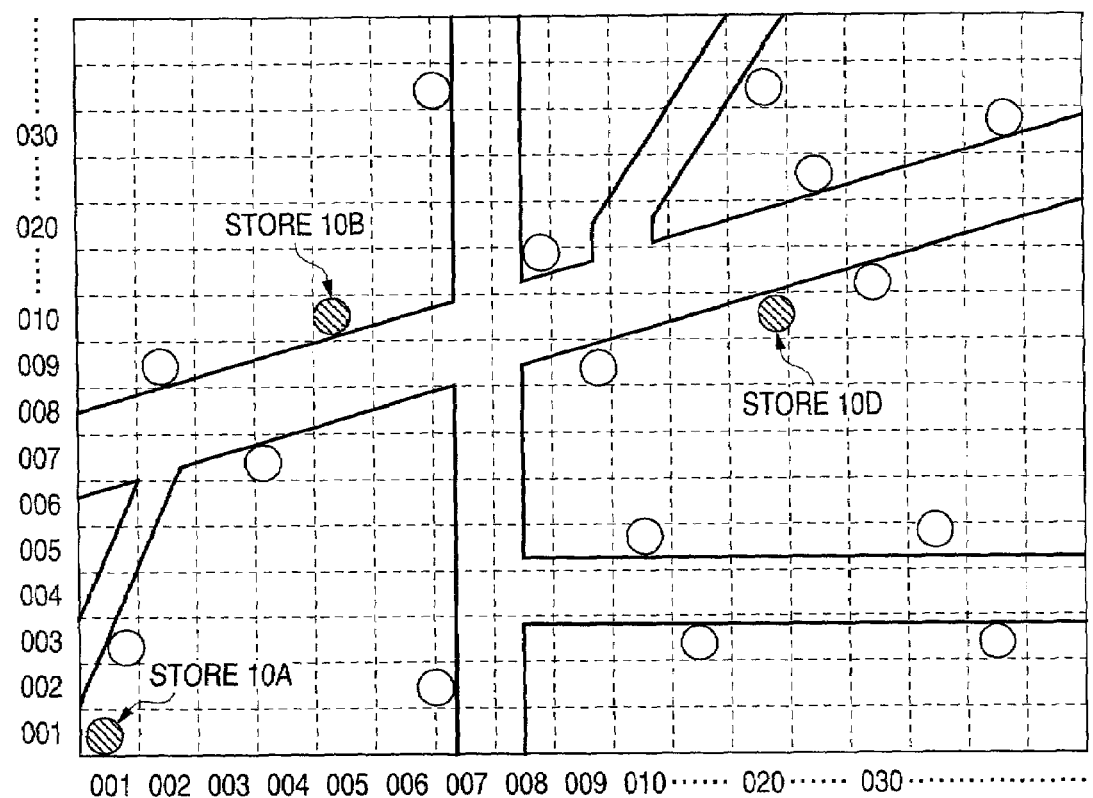
FIG. 6 is a drawing cited to describe unique identification numbers assigned to stored in the first embodiment of the invention.

FIG. 6 is a schematic representation to define the above-described identification numbers. Each identification number in the embodiment is provided by reflecting geographical position information of the store corresponding to the identification number. For example, a region as in FIG. 6 is divided like mesh and a predetermined store is assigned to each cell. For example, if a predetermined region is separated like mesh in accordance with the latitude and longitude and code numbers as in FIG. 6 are assigned to each cell, the store 10A exists at the position of latitude (001), longitude (001).

The store 10B exists at the position of latitude (005), longitude (010). The code number of the information provider is added to the code numbers corresponding to the geographical position information to form the identification number for each store. That is, the structure of the identification number is represented as the continuous numeric value of (code number of information provider + code number based on latitude of store + code number based on longitude of store). As an example, the store 10A requests the information provider 20A to carry an advertisement in the magazine and thus the identification number of the store 10A is defined as (20A001001). Likewise, the identification number of the store 10B is defined as (20A005001).

The store 10A also requests the information provider 20B to carry an advertisement in the magazine and thus the identification number of the store 10A is defined as (29B001001) in the information providing magazine 21B published by the advertisement provider 20B. The identification number assigning method is one example and any other method may be adopted. The destination of each store is set in the navigation terminal NA according to the identification number of the store and when the vehicle installing the navigation terminal arrives at the store, the navigation terminal NA recognizes the advertisement provider to which it should transmit an arrival notification signal according to the identification number, as described later.

Thus, each identification number carried in each information providing magazine shown in FIGS. 5A to 5C is made up of the numbers to recognize the geographical position information for each store and the advertisement provider publishing the information providing magazine.

Figure 7:
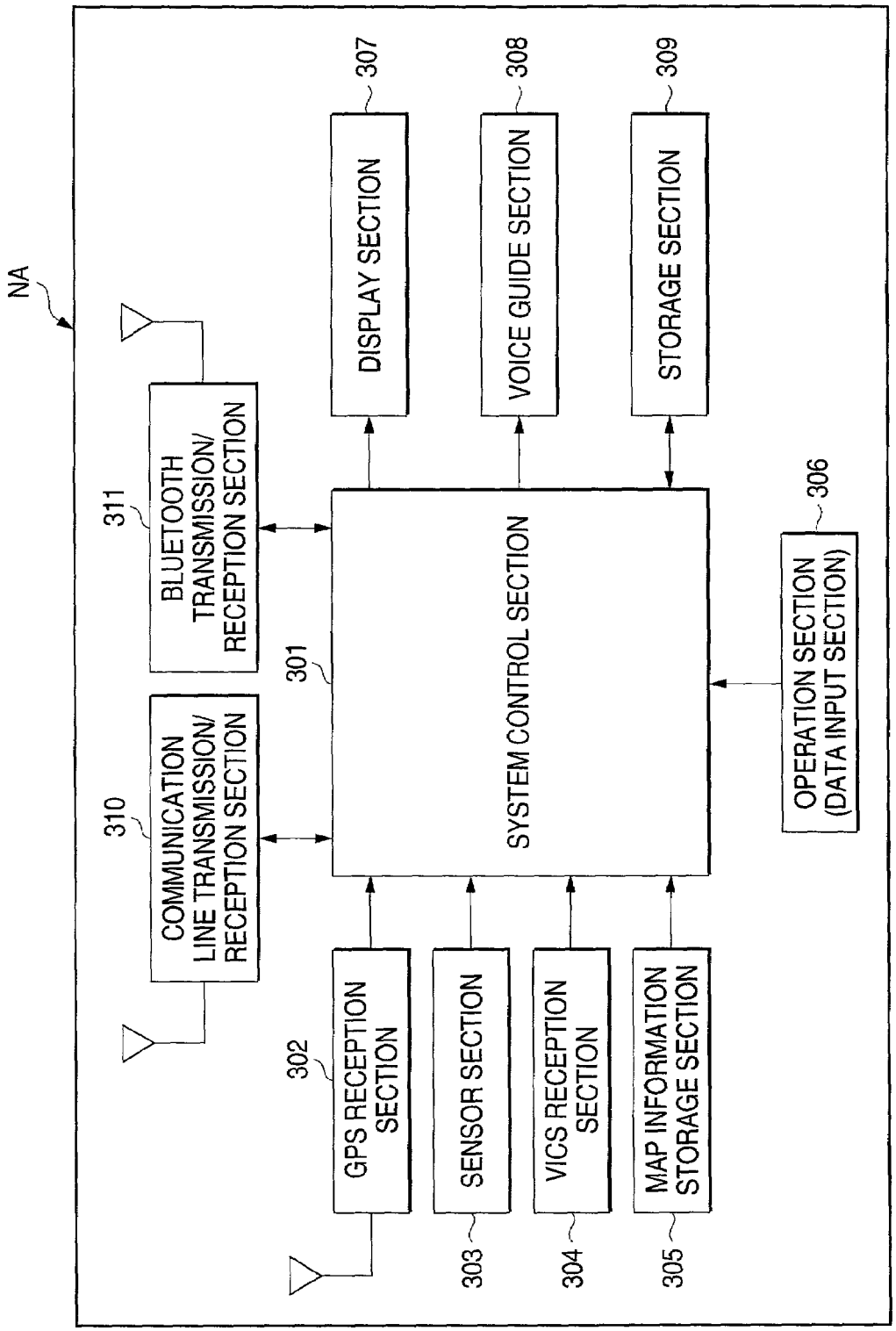
FIG. 7 is a block diagram to show the internal configuration of a navigation terminal in the first embodiment of the invention.
Figure 8:
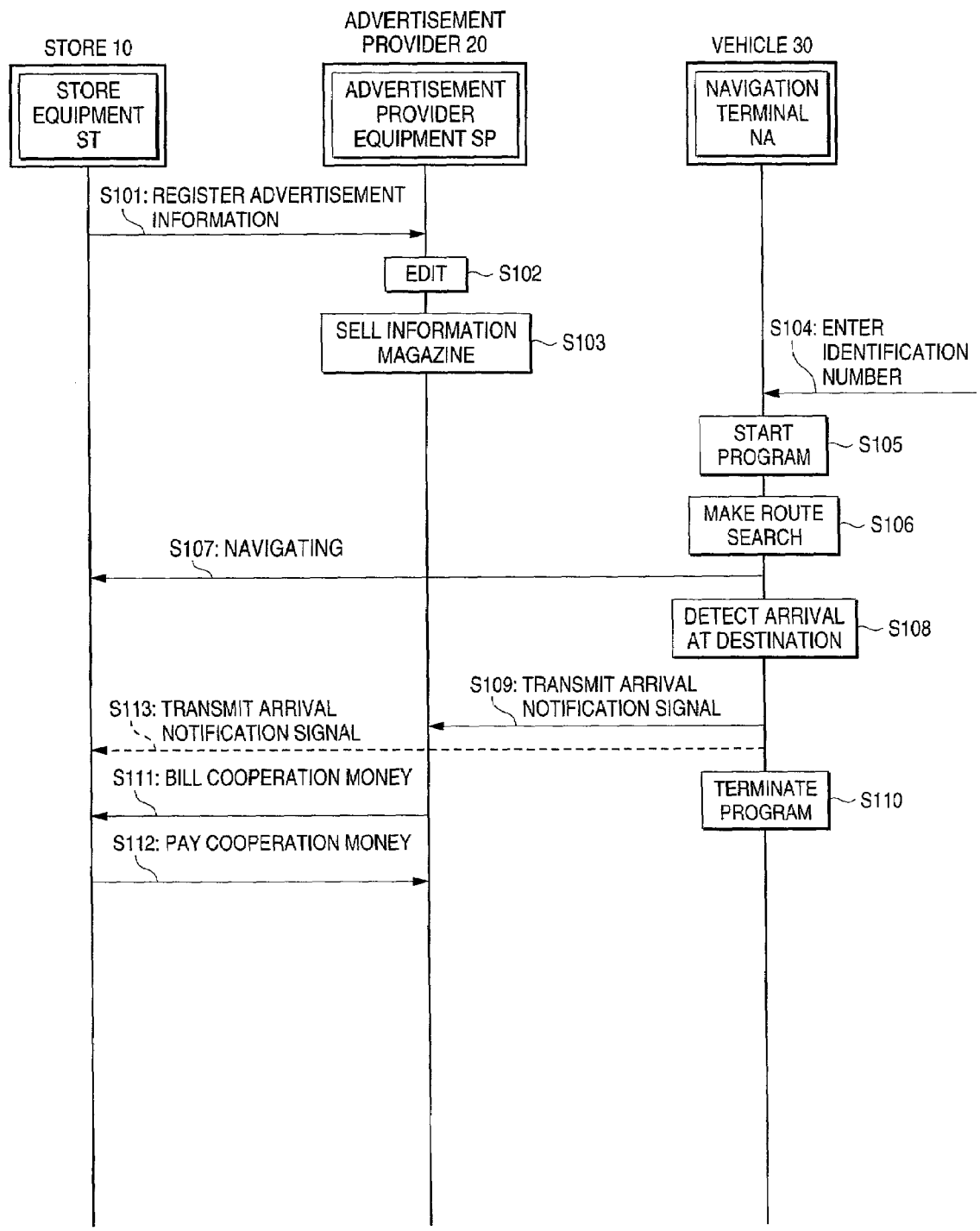
FIG. 8 is a sequence chart cited to describe the operation of the advertisement information providing system of the first embodiment of the invention.

FIG. 7 is a block diagram to show the internal configuration of the navigation terminal NA installed in the vehicle 30 as a guide section for guiding the vehicle to a predetermined destination.

As shown in FIG. 7, the navigation terminal NA according to the embodiment is made up of a system control section 301 for shouldering the system nucleus as timer means, detection means, search means, and comparison means, a GPS (Global Positioning System) reception section 302, a sensor section 303 including a distance sensor for detecting the move distance and speed of the vehicle, an angle sensor for detecting the turn angular speed of the vehicle, and the like, a VICS (Vehicle Information Communication System) reception section 304 as an acquisition section, a map information storage section 305, an operation section 306 as route setting means and resetting means, a display section 307 as notification means implemented as a liquid crystal display, etc., a voice guide section 308 as notification means including a voice amplifier, a loudspeaker, and the like, a storage section 309 for temporarily storing information entered through the operation means, etc., a communication line transmission/reception 310 for transmitting and receiving various pieces of wired or wireless information other than the above, and a Bluetooth transmission/reception 311 for transmitting and receiving a signal based on Bluetooth.

First, the GPS reception section 302 receives navigation radio waves from a plurality of GPS satellites and generates a GPS signal containing current time or vehicle current position information, etc., based on position information, etc., contained in the received signals and outputs the GPS signal to the system control section 301.

On the other hand, the sensor section 303 generates a position signal indicating the current position of the vehicle autonomously found based on the detection results of the sensors contained in the sensor section 303 (namely, the current position found by integrating the move distance with the starting point as the origin and the move direction) and outputs the position signal to the system control section 301.

Thus, the system control section 301 mainly uses the current position indicated by the position signal and detects the current position of the vehicle while correcting the current position based on the current position information, etc., indicated by the GPS signal, and outputs the corrected position to the display section 307 as a display signal for displaying a position mark, etc., indicating the detected current position on a display screen of the display section 307.

On the other hand, the VICS reception section 304 receives VICS information containing traffic congestion information transmitted from the VICS, generates a VICS signal containing the traffic congestion information, etc., and outputs the VICS signal to the system control section 301.

The map information storage section 305 made up of a DVD-ROM (DVD-Read Only Memory) drive, a hard disk drive, etc., collectively stores map information displayed on the display section 307 and used for navigation processing, searches necessary map information, generates a map signal, and outputs the map signal to the system control section 301.

The data structure in road information stored in the map information storage section 305 is stored in such a manner that meshes having the length of one side (the length on the actual land lay is reduced to the length responsive to the scale of the map) are made continuous lengthwise and crosswise like the relationship between the stores and geometrical position information previously described with reference to FIG. 6. At the time, unique numbers are assigned to the meshes. In the invention, the unique numbers are matched with the identification numbers defined in FIGS. 5 and 6.

Next, when the user operates the operation section 306 as required to execute navigation processing, the operation section 306 generates an operation signal corresponding to the operation performed by the user and outputs the operation signal to the system control section 301.

On the other hand, for the driver, etc., the display section 307 displays information required for navigation processing based on the display signal output from the system control section 301. At this time, the information displayed on the display section 307 includes text information for move guide, time information of the arrival scheduled time, the current time, etc., state information indicating the reception state of the GPS radio wave, and the like as well as the map information stored in the map information storage section 305 (including road information indicating the road laying state of the road positions, the road widths, etc., point information, information concerning prominent buildings, and the like).

The voice guide section 308 synthesizes a guide voice, etc., required for navigation processing based on a voice control signal from the system control section 301 and emits a sound in the vehicle.

Concurrently with processing of the components, the system control section 301 controls reading the map information stored in the map information storage section 305, display on the display section 307, and output of the guide voice, etc., in the voice guide section 308 and performs centralized control of route guide processing described later, etc., in addition to display control processing of the position mark described above.

The storage section 309 is storage means implemented as memory such as RAM for storing user-registered destination information and point information, the identification numbers of the invention, etc.

The communication line transmission/reception 310 is a communication interface section for acquiring information on the Internet, etc., for example, and can externally acquire various pieces of information, area information, etc., required for navigation. It is also used to connect the navigation terminal NA to a communication machine such as a portable information terminal.

On the other hand, the Bluetooth transmission/reception 311 can transmit and receive a radio wave in a transmission system using a feeble radio wave of a 2.4-GHz band requiring no license and transmits and receives a radio wave to and from a Bluetooth transmission/reception section installed in another terminal.

Next, the operation sequence of information providing processing in the advertisement information providing system S1 according to the first embodiment of the invention will be discussed with a flowchart of FIG. 8.

FIG. 8 is a sequence chart cited to describe the operation of the advertisement information providing system S1 of the first embodiment; it shows the operation relationships among the store equipment ST provided in the store 10, the advertisement providing apparatus SP provided in the advertisement provider 20, and the navigation terminal NA provided in the vehicle 30.

In the information providing processing according to the first embodiment, first the store 10 requests the advertisement provider 20 to carry advertisement information in a magazine (step S101). When receiving the request, the advertisement provider 20 edits the advertisement information magazine to carry the advertisement (step S102) and sells the completed information providing magazine (step S103). In the sequence chart, only the store 10 is shown, but the advertisement provider may gather advertisements from a plurality of stores as shown in FIGS. 4A to 4C and edit the information magazine. Also, one store may request more than one advertisement provider to carry an advertisement in a magazine.

Next, if the user purchasing the sold advertisement information magazine finds a store to visit in the advertisement information magazine, he or she enters the identification number of the store entered in the advertisement information magazine in a destination setting step of the navigation terminal NA (step S104).

For example, if the user purchases the advertisement information magazine 21A issued by the advertisement provider 20A, when he or she visits the store 10A, the user enters the identification number (20A001001) assigned to the store in the advertisement information magazine 21A as destination information in the navigation terminal NA. To do this, the user may use a remote control, a voice recognition device, or a barcode or may enter the advertisement information (identification number) in a memory card with a personal computer at home, etc., and insert the memory card into the navigation terminal NA.

As the identification number is entered, the navigation terminal NA starts an arrival notification program (step S105) and transmits an arrival notification signal at step S108 described later. The navigation terminal NA makes a route search based on the entry of the identification number (step S106). That is, since the identification number contains the geometrical position information of the store as described above, the navigation terminal NA makes a route search based on the position information. Then, the navigation terminal NA starts navigation of the vehicle 30 (step S107).

Next, when the vehicle 30 arrives at a predetermined mesh area containing the destination (for example, the store 10A) (step S108), the navigation terminal NA transmits an arrival notification signal to the advertisement provider 20 (step S109) In the navigation terminal NA, as the identification number is entered at step S104 described above, the arrival notification program is started (step S105) and when the vehicle arrives at the predetermined mesh area containing the destination as a result of the navigation involving the route search, the arrival notification signal is transmitted to the advertisement provider based on the identification number.

That is, if (20A001001) is set as the identification number, the navigation terminal NA transmits the arrival notification signal to the advertisement provider 20A when the vehicle arrives at the store. For the advertisement provider 20A to recognize the store visited by the user, it is advisable to superpose the identification number entered in the navigation terminal NA on the arrival notification signal. The advertisement provider 20A can recognize the store (for example, the store 10A) based on the identification number contained in the arrival notification signal.

Possible as a specific notification method of the arrival notification program is, for example, a method wherein the communication line transmission/reception 310 contained in the navigation terminal NA connects to the Internet and transmits arrival information to the server of the advertisement provider 20, a method wherein the radio transmission/reception section 104 installed in the store 10 is connected to the radio transmission/reception section 205 of the advertisement provider 20 and the communication line transmission/reception 310 contained in the navigation terminal NA communicates with the radio transmission/reception section 104 in the store 10, whereby the advertisement provider 20 is notified of the communication result, or the like.

On the other hand, the navigation terminal NA terminates the arrival notification program (step S110) as it transmits the arrival notification signal. That is, when the user purchasing the information providing magazine visits the store carried in the information providing magazine, the role of the program is terminated. Since it is possible that some users do not visit the store although they enter the identification number, when any other destination is set or a predetermined time has elapsed, the arrival notification program may be terminated.

Next, the advertisement provider 20 receiving the arrival notification program derives the store information from the identification number superposed on the arrival notification signal and bills the cooperation money for the store (step S111) The store 10 pays the cooperation money based on the billed amount of money (step S112).

Since the store 10 cannot recognize that the reason why the user visits the store is that he or she sees the advertisement information carried in the information magazine, the navigation terminal NA may also transmit the arrival notification signal to the store as at step S113. At the time, the arrival notification program may contain a transmission program to the store.

As described above, in the advertisement information providing system S1 of the first embodiment according to the invention, when the user purchasing the information providing magazine 21 visits the store 10, the store 10 pays the cooperation money to the advertisement provider 20, so that the advertisement provider 20 can get enormous cooperation money (running cost) as the magazine carries advertisements of a large number of stores, and it is made possible to make reduction in the price of the information providing magazine and the advertisement charge accordingly. The system is reasonable for the store because the store pays the cooperation money to the advertisement provider 20 introducing the user seeing the information providing magazine into the store, and if the advertisement charge becomes low, it is made possible for the store to furthermore request the advertisement provider to carry advertisements in the magazine. The user can set the store as the destination simply by entering the identification number and thus is relieved of burdensome setting operation.

Second Embodiment

Figure 9:
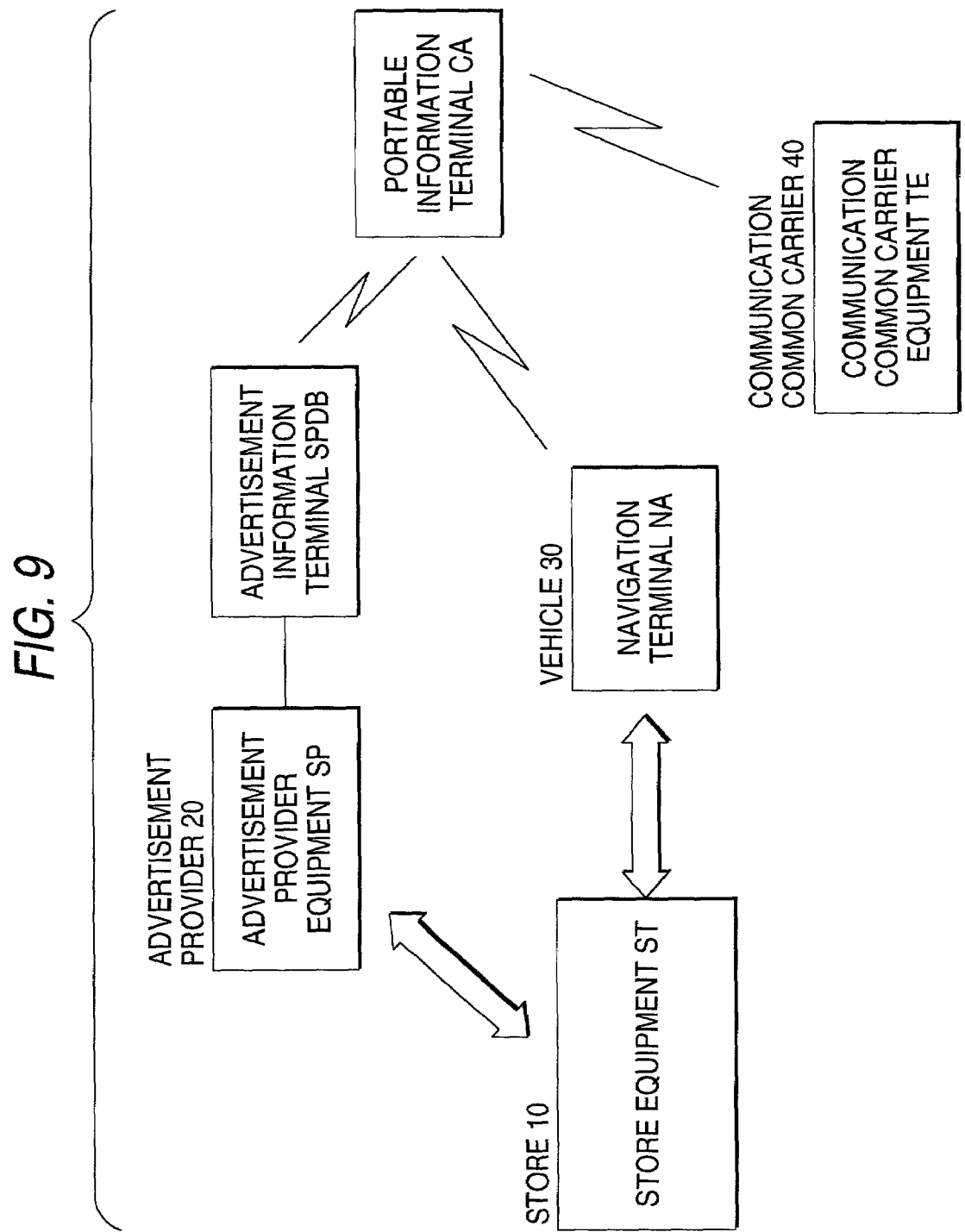
FIG. 9 is a block diagram to show the general configuration of an advertisement information providing system of a second embodiment of the invention.
Figure 10:
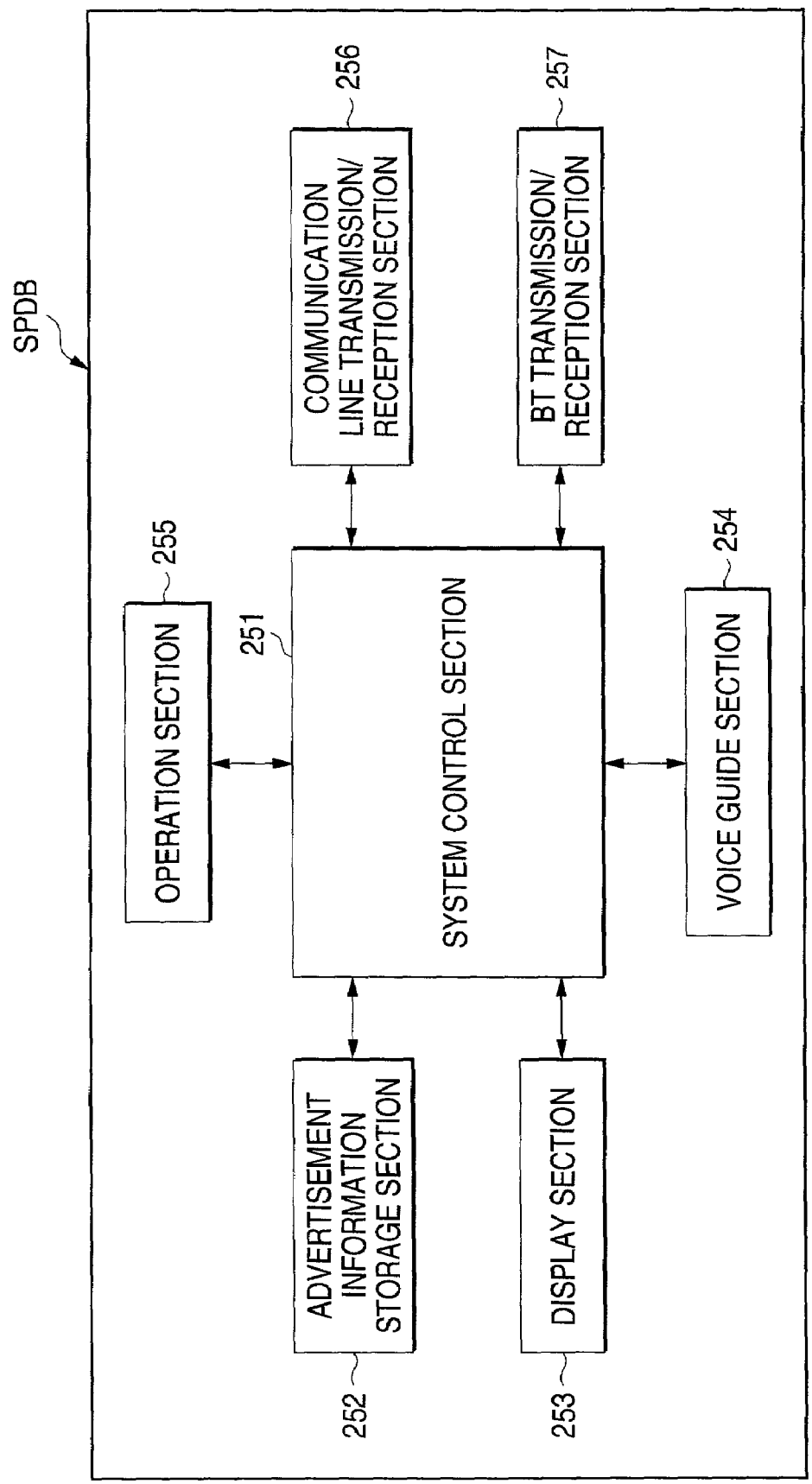
FIG. 10 is a block diagram to show the detailed configuration of an advertisement information terminal managed by an advertisement provider in the second embodiment of the invention.
Figure 11:
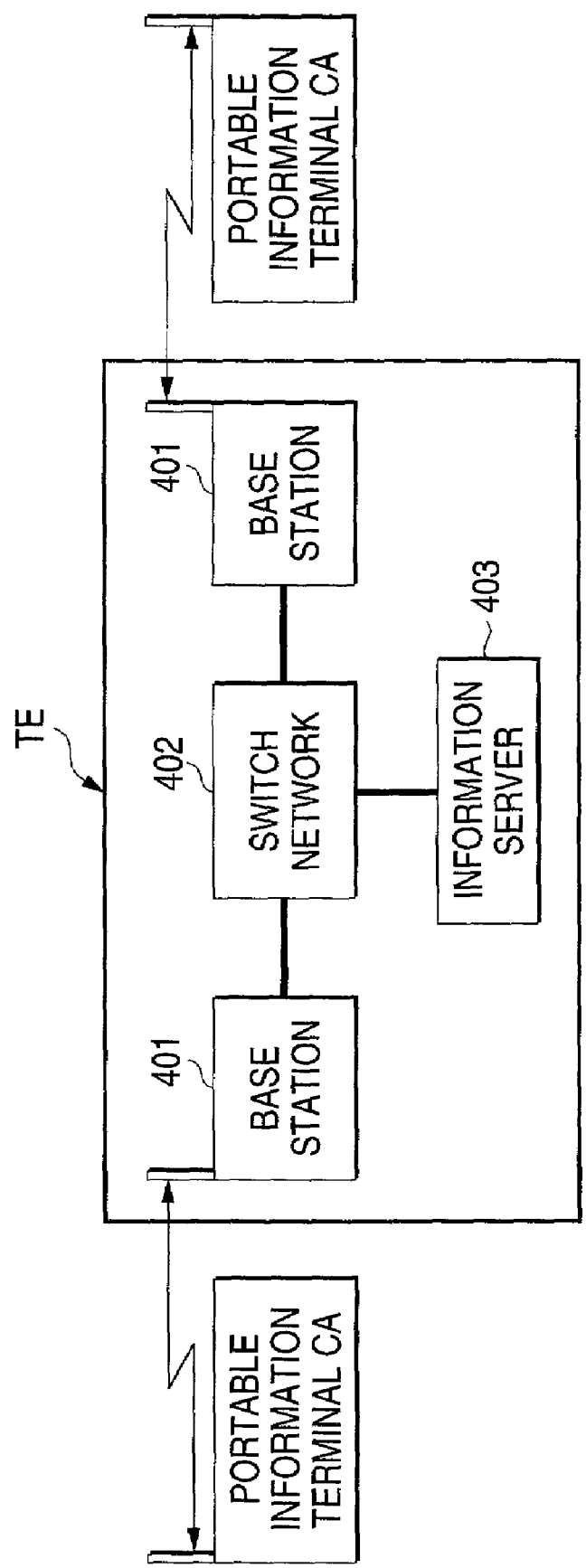
FIG. 11 is a block diagram to show the detailed configuration of communication common carrier equipment in the second embodiment of the invention.
Figure 12:
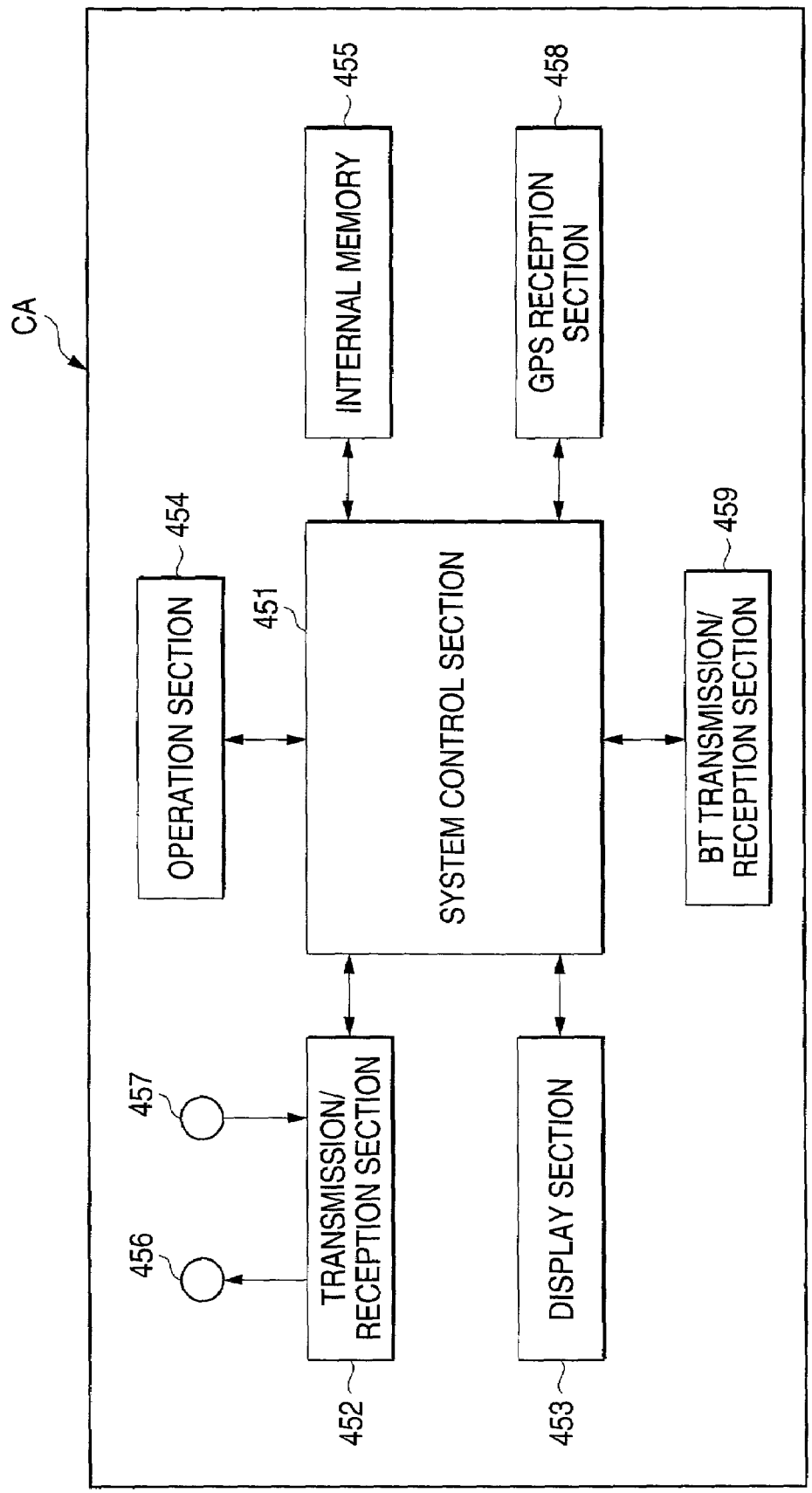
FIG. 12 is a block diagram to show the detailed configuration of a portable information terminal in the second embodiment of the invention.
Figure 13:
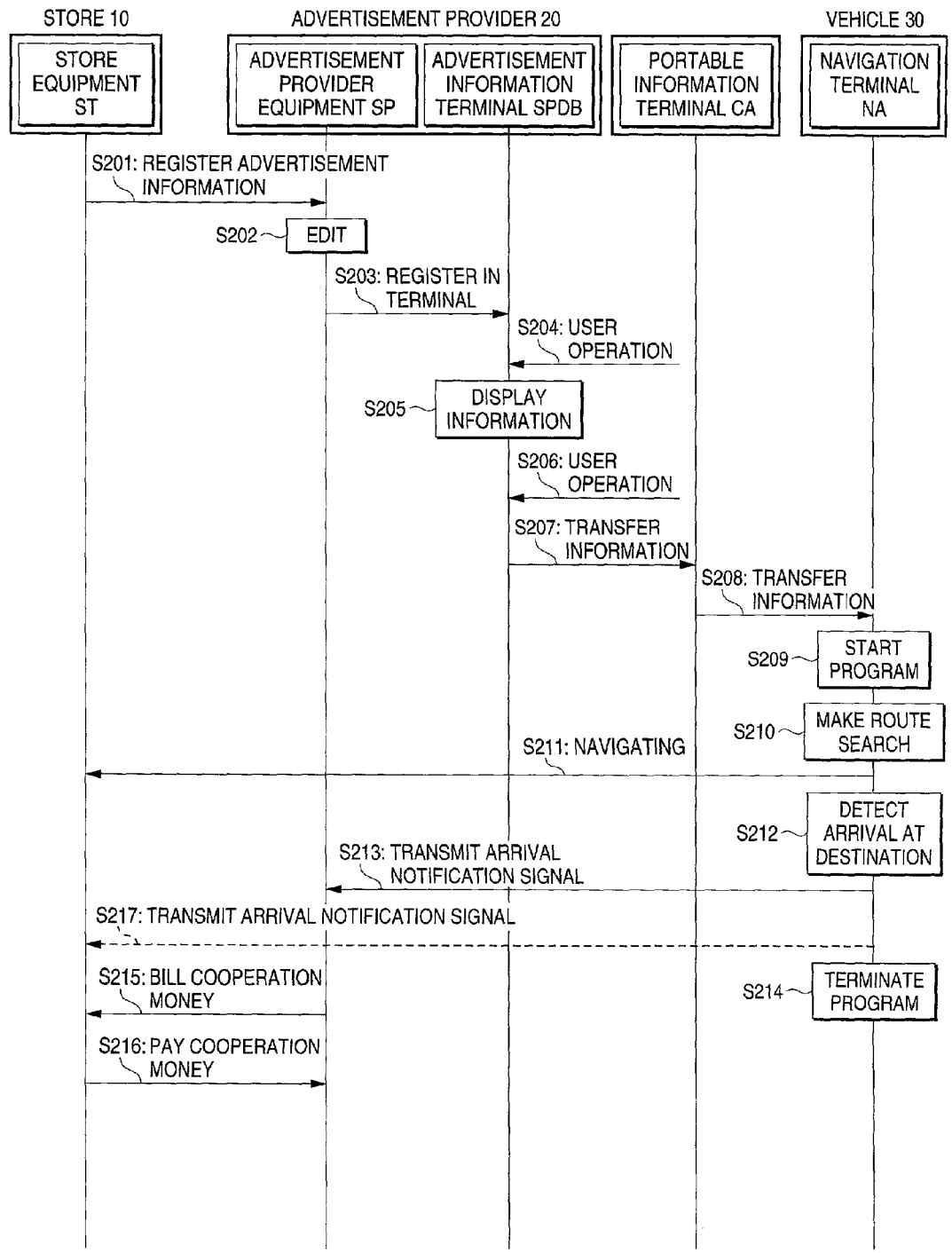
FIG. 13 is a sequence chart cited to describe the operation of the advertisement information providing system of the second embodiment of the invention.
Figure 14:
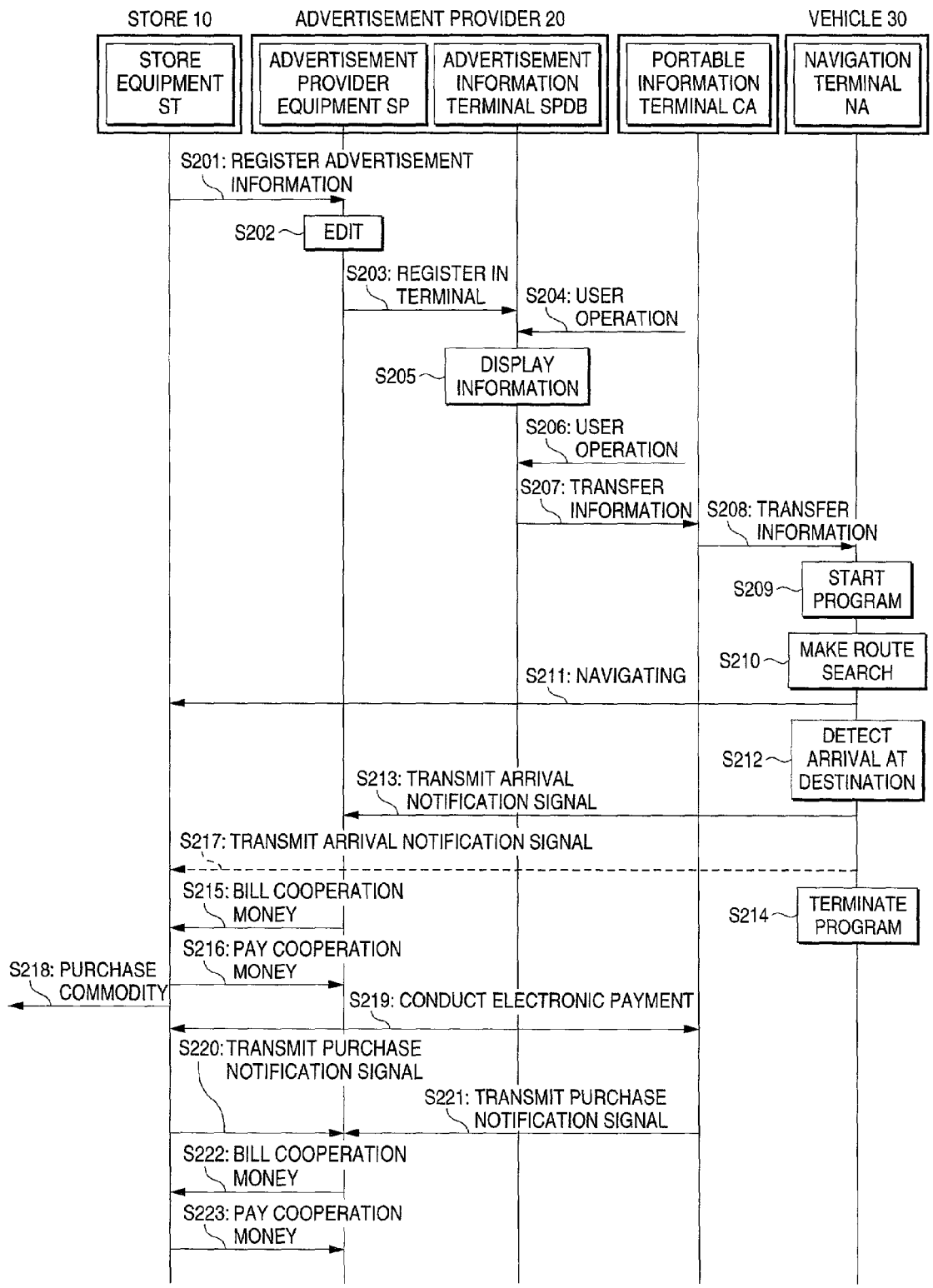
FIG. 14 is a sequence chart cited to describe the operation of advertisement information providing system of a modification of the second embodiment of the invention.

Next, a second embodiment of the invention will be discussed with reference to FIGS. 9 to 14. FIG. 9 is a block diagram to show the general configuration of an advertisement information providing system according to the second embodiment of the invention, FIGS. 10 to 12 are drawings to describe the detailed structures of blocks making up the advertisement information providing system, and FIGS. 13 and 14 are operation sequence charts to show information providing processing in the advertisement information providing system.

First, the general configuration and the operation of the advertisement information providing system according to the second embodiment will be discussed.

As shown in FIG. 9, the advertisement information providing system 32 of the second embodiment is made up of store equipment ST provided in a store 10, an advertisement providing apparatus SP provided in an advertisement provider 20, an advertisement information terminal SPDB managed by the advertisement provider 20, a navigation terminal NA provided in a vehicle 30, communication common carrier equipment TE provided in a communication common carrier 40, and a portable information terminal CA making a predetermined contract with the communication common carrier 40.

Blocks identical with or similar to those previously described with reference to the accompanying drawings in the first embodiment are denoted by the same reference numerals and will not be discussed in detail again.

For simplicity, one store 10, one advertisement provider 20, one advertisement information terminal SPDB, one vehicle 30 (navigation terminal NA), one communication common carrier 40, and one portable information terminal CA are shown in the figure, but the advertisement information providing system may comprise a plurality of stores, a plurality of advertisement providers, a plurality of advertisement information terminals, a plurality of vehicles (navigation terminals), a plurality of communication common carriers, and a plurality of portable information terminals as in the embodiment described later.

The store 10 and the advertisement provider 20 have the relationship of supplying information to each other by wired or wireless means or any other means. The advertisement provider 20 and the navigation terminal NA provided in the vehicle 30 have the relationship wherein the navigation terminal NA makes a route search according to destination information based on the identification number for each store issued by the advertisement provider 20. Predetermined program information issued by the advertisement provider is installed in the navigation terminal NA as in the first embodiment.

The general operation is as follows:

In the described advertisement information providing system S2, the advertisement provider 20 carries advertisement information of each store in each advertisement information terminal SPDB managed by the advertisement provider 20 and the advertisement information is put into a database with a predetermined identification number assigned for each store.

The advertisement information terminal SPDB is installed in a convenient store in a predetermined area in which the store 10 exists, a service area on an expressway, or the like, for example. The user visiting the place where the advertisement information terminal SPDB is installed reads store information stored in the advertisement information terminal SPDB and downloads the store information of the store 10 for the user to visit into his or her portable information terminal CA. To download the store information, radio communication based on Bluetooth can be used.

Then, to visit the store 10, the user transfers the identification number in the store information to the navigation terminal NA installed in the vehicle 30. The navigation terminal NA recognizes the destination based on the identification number and guides the vehicle 30 based on the route search result. Then, when the vehicle 30 arrives at the store 10, the navigation terminal NA transmits an arrival notification signal indicating that the vehicle 30 arrives at the store 10 to the advertisement provider 20, which then collects cooperation money from the store 10 based on the arrival notification signal.

Next, the detailed configurations and the operation of the blocks making up the advertisement information providing system S2 of the second embodiment will be discussed with reference to FIGS. 10 to 12.

FIG. 10 is a block diagram to show the detailed configuration of the advertisement information terminal SPDB managed by the advertisement provider 20. The advertisement information terminal SPDB provides the user with the advertisement information of each store.

The advertisement information terminal SPDB comprises a system control section 251 as the nucleus, an advertisement information storage section 252, a display section 253, a voice guide section 254, an operation section 255, a communication line transmission/reception section 256, a Bluetooth transmission/reception section 257.

First, the advertisement information storage section 252 is a database storing advertisement information requested by each store 10 to be carried and stores advertisement information edited by an advertisement information edit section 203 in the advertisement providing apparatus SP. Next, the display section 253 is a monitor for displaying the advertisement information; for example, it is implemented as a liquid crystal monitor, etc. To facilitate selection operation of the user, the display section 253 may have a so-called touch panel function. Next, the voice guide section 254 produces a predetermined guide voice and introduces advertisement information through a loudspeaker (not shown) based on the selection operation of the user.

Next, the operation section 255 accepts selection a processing of the user; it is provided for the user to select desired advertisement information. To transfer desired information to the portable information terminal CA, the user also uses the operation section 255.

Next, the communication line transmission/reception section 256 transmits and receives a conversation signal of a portable information terminal or transmits and receives to and from the Internet, for example. It collectively transmits and receives a radio signal to and from the advertisement provider 20 and the portable information terminal CA owned by the user. The Bluetooth transmission/reception section 257 can transmit and receive a radio wave in a transmission system using a feeble radio wave of a 2.4-GHz band requiring no license and transmits and receives a radio wave to and from a Bluetooth transmission/reception section installed in another terminal.

Last, the system control section 251 is a processing section for collectively controlling the described blocks.

FIG. 11 is a block diagram to show the internal configuration of the communication common carrier equipment TE provided in the communication common carrier 40.

The communication common carrier equipment TE comprises base stations 401, a switch network 402, and an information server 403.

Each base station 401 relays transmitted and received signals between one portable information terminal CA and another and is placed for each small area called a cell. FIG. 11 shows two base stations 401; in fact, however, a large number of base stations exist. The base stations 401 are connected to the switch network 402 via dedicated lines; they form a network.

Next, the information server 403 collectively manages the portable information terminals CA making a predetermined contract with the communication common carrier 40 and the users of the terminals. The information server 403 manages the geometrical position information of the portable information terminals CA acquired by the base stations 401 and can always keep track of the geometrical positions of the portable information terminals.

FIG. 12 is a block diagram to show the internal configuration of the portable information terminal CA making a predetermined contract with the communication common carrier 40.

The portable information terminal CA comprises a system control section 451 as the nucleus, a transmission/reception section 452, a display section 453, an operation section 454, internal memory 455, a microphone 456, a loudspeaker 457, a GPS (Global Positioning System) reception section 458, and a Bluetooth transmission/reception section 459.

The transmission/reception section 452 can communicate with the base stations 401 provided in the communication common carrier equipment TE for transmitting and receiving information. The display section 453 displays various pieces of information stored in the portable information terminal CA and also displays various received pieces of information, etc.

Next, the operation section 454 is provided for accepting operation involved in information processing; in the embodiment, for example, the operation section 454 is used to acquire the advertisement information of each store from the advertisement information terminal SPDB and is also used to transfer the advertisement information to the navigation terminal NA.

The internal memory 455 is storage means for storing various received pieces of information; in the embodiment, it stores the advertisement information. The GPS reception section 458 receives navigation radio waves from a plurality of GPS satellites and generates a GPS signal containing the current time or the current position information of the portable information terminal CA, etc., based on position information, etc., contained in the received signals and outputs the GPS signal to the system control section 451. The Bluetooth transmission/reception section 459 can transmit and receive a radio wave in a transmission system using a feeble radio wave of a 2.4-GHz band requiring no license and transmits and receives a radio wave to and from a Bluetooth transmission/reception section installed in another terminal.

Last, the system control section 451 collectively controls the described blocks.

Next, the operation sequence of information providing processing in the advertisement information providing system S2 according to the second embodiment of the invention will be discussed with a flowchart of FIG. 13.

FIG. 13 is a sequence chart cited to describe the operation of the advertisement information providing system S2 of the second embodiment; it shows the operation relationships among the store equipment ST provided in the store 10, the advertisement providing apparatus SP provided in the advertisement provider 20, the advertisement information terminal SPDB managed by the advertisement provider 20, the portable information terminal CA, and the navigation terminal NA provided in the vehicle 30.

In the information providing processing according to the second embodiment, first the store 10 requests the advertisement provider 20 to carry advertisement information (step S201). When receiving the request, the advertisement provider 20 edits the advertisement information to store the advertisement information in the advertisement information terminal SPDB (step S202) and stores the completed advertisement information in the advertisement information terminal SPDB (step S203). In the sequence chart, only the store 10 is shown, but the advertisement provider 20 may gather advertisements from a plurality of stores and stores the advertisements in the advertisement information terminal SPDB. Also, one store may request more than one advertisement provider to carry an advertisement in the advertisement information terminal SPDB. The advertisement information terminals SPDB are installed in convenience stores, etc., all over the country, for example, and the advertisement provider 20 edits the advertisement information using dedicated or leased communication lines.

Next, the user operates the advertisement information terminal SPDB installed in a convenience store, etc., (step S204), whereby the store advertisement information is displayed on the display section 253 of the advertisement information terminal SPDB (step S205). The advertisement information can be displayed in classification by category, by area, etc., for example, and the user can display his or her desired information according to a predetermined operation procedure. Then, the user selects store information (step S206) and transfers the selected store information to the portable information terminal CA (step S207). At this time, the user may transfer the store information by radio communications based on Bluetooth, for example. The store information is assigned the identification number for each store as in the first embodiment.

Next, to visit the store 10 corresponding to the acquired advertisement information, the user rides in the vehicle 30 and starts the navigation terminal NA. After the navigation terminal NA is started, the user transfers the advertisement information of the store 10 in the portable information terminal CA to the navigation terminal NA (step S208). To transfer the advertisement information of the store 10, for example, the portable information terminal CA and the navigation terminal NA may form a Bluetooth communication network and this communication network may be used. At the time, predetermined program information may be previously contained in the portable information terminal CA and when the navigation terminal NA enters the Bluetooth communication area, automatically the identification information may be transferred.

Next, as the identification number is entered, the navigation terminal NA starts an arrival notification program (step S209) and transmits an arrival notification signal at step S213 described later. The navigation terminal NA makes a route search based on the entry of the identification number (step S210). For example, to visit the store 10A stored in the advertisement information terminal SPDB, if the advertisement information of the store 10A is downloaded into the portable information terminal CA, identification number (20A001001) is transferred from the portable information terminal CA to the navigation terminal NA by Bluetooth communications. The navigation terminal NA sets the destination and makes a route search based on the geometrical position information in the identification number (step S210) Then, the navigation terminal NA starts navigation of the vehicle 30 (step S211).

Next, when the vehicle 30 arrives at a predetermined mesh area containing the destination (for example, the store 10A) (step S212), the navigation terminal NA transmits an arrival notification signal to the advertisement provider 20 (step S213). In the navigation terminal NA, as the identification number is transferred at step S208 described above, the arrival notification program is started (step S209) and when the vehicle arrives at the predetermined mesh area containing the destination as a result of the navigation involving the route search, the arrival notification signal is transmitted to the advertisement provider based on the identification number.

That is, if (20A001001) is set as the identification number, the navigation terminal NA transmits the arrival notification signal to the advertisement provider 20A when the vehicle arrives at the store. For the advertisement provider 20A to recognize the store visited by the user, it is advisable to superpose the identification number entered in the navigation terminal NA on the arrival notification signal. The advertisement provider 20A can recognize the store (for example, the store 10A) based on the identification number contained in the arrival notification signal.

Possible as a specific notification method of the arrival notification program is, for example, a method wherein a communication line transmission/reception 310 contained in the navigation terminal NA connects to the Internet and transmits arrival information to the server of the advertisement provider 20, a method wherein a radio transmission/reception section 104 installed in the store 10 is connected to a radio transmission/reception section 205 of the advertisement provider 20 and the communication line transmission/reception 310 contained in the navigation terminal NA communicates with the radio transmission/reception section 104 in the store 10, whereby the advertisement provider 20 is notified of the communication result, or the like.

On the other hand, the navigation terminal NA terminates the arrival notification program (step S214) as it transmits the arrival notification signal. That is, when the user visits the store based on the advertisement information stored in the advertisement information terminal SPDB, the role of the program is terminated. Since it is possible that some users do not visit the store although they enter the identification number, when any other destination is set or a predetermined time has elapsed, the arrival notification program may be terminated.

Next, the advertisement provider 20 receiving the arrival notification program derives the store information from the identification number superposed on the arrival notification signal and bills the advertisement charge as the cooperation money for the store (step S215). The store 10 pays the cooperation money based on the billed amount of money (step S216).

Since the store 10 cannot recognize that the reason why the user visits the store is that he or she sees the advertisement information carried in the advertisement information terminal SPDB, the navigation terminal NA may also transmit the arrival notification signal to the store 10 as at step S217. At the time, the arrival notification program may contain a transmission program to the store.

As described above, in the advertisement information providing system S2 of the second embodiment according to the invention, when the user acquiring the advertisement information from the advertisement information terminal SPDB visits the store 10, the store 10 pays the cooperation money to the advertisement provider 20, so that the advertisement provider 20 can get enormous cooperation money as the advertisement information terminal SPDB stores advertisements of a large number of stores, and it is made possible to make reduction in the advertisement charge accordingly. The system is reasonable for the store 10 because the store 10 pays the cooperation money to the advertisement provider 20 introducing the user acquiring information from the advertisement information terminal SPDB into the store, and if the advertisement charge becomes low, it is made possible for the store to furthermore request the advertisement provider to carry advertisements in the advertisement information terminal SPDB. The user can use the portable information terminal CA to easily set the store as the destination and thus is relieved of burdensome setting operation.

Modification of Second Embodiment

Next, a modification of the second embodiment according to the invention will be discussed with reference to FIG. 14.

A sequence chart of FIG. 14 is a modification of the sequence chart of the advertisement information providing system S2 of the second embodiment shown in FIG. 13.

The advertisement information providing system S2 in the modified embodiment is a system wherein when the user visits a store and purchases a commodity based on advertisement information acquired from the advertisement information terminal SPDB, the store pays the cooperation money to the advertisement provider.

FIG. 14 is a sequence chart cited to describe the operation of the advertisement information providing system S2 of the modification of the second embodiment; it shows the operation relationships among the store equipment ST provided in the store 10, the advertisement providing apparatus SP provided in the advertisement provider 20, the advertisement information terminal SPDB managed by the advertisement provider 20, the portable information terminal CA, and the navigation terminal NA provided in the vehicle 30. In the sequence chart, steps S201 to S217 identical with those previously described with reference to FIG. 13 will not be discussed again.

When the user visits the store 10 corresponding to the acquired advertisement information at step S212 and purchases a commodity in the store 10 (step S218), in the modified embodiment, electronic payment processing is conducted (step S219). To do this, for example, the Bluetooth transmission/reception section 459 provided in the portable information terminal CA and the radio transmission/reception section 104 placed in the store 10 are connected by radio communications and the electronic payment processing section 103 placed in the store performs the electronic payment processing.

When the electronic payment processing is performed, the store 10 transmits a purchase notification signal to the advertisement provider 20 (step S220). As for the purchase notification signal, a predetermined agreement is made between the store 10 and the advertisement provider 20 and such a program to transmit the identification number from the portable information terminal CA of the user when electronic payment is made based on purchase of a commodity is set and the store 10 is programmed so as to transmit the purchase notification signal to the advertisement provider 20 based on reception of the identification number.

The portable information terminal CA may transmit the purchase notification signal to the advertisement provider 20 at the electronic payment time (step S221).

Next, the advertisement provider 20 receiving the purchase notification program derives the store information from the identification number superposed on the purchase notification signal and bills the advertisement charge as the cooperation money for the store (step S222). The store 10 pays the cooperation money based on the billed amount of money (step S223).

As described above, in the advertisement information providing system S2 according to the modification of the second embodiment according to the invention, when the user acquiring the advertisement information from the advertisement information terminal SPDB visits the store 10 and purchases a commodity, the store 10 pays the cooperation money to the advertisement provider 20, so that the advertisement provider 20 can get enormous cooperation money as the advertisement information terminal SPDB stores advertisements of a large number of stores, and it is made possible to make reduction in the advertisement charge accordingly. The system is reasonable for the store 10 because the store 10 pays the cooperation money to the advertisement provider 20 introducing the user acquiring information from the advertisement information terminal SPDB into the store if the user purchases a commodity in the store, and if the advertisement charge becomes low, it is made possible for the store to furthermore request the advertisement provider to carry advertisements in the advertisement information terminal SPDB. The user can use the portable information terminal CA to easily set the store as the destination and thus is relieved of burdensome setting operation.

In the modification of the second embodiment, the paying steps of the cooperation money based on the arrival notification signal (steps S213 to S217) may be skipped. That is, the cooperation money may be paid only if the user purchases a commodity in the corresponding store.

Third Embodiment

Figure 15:
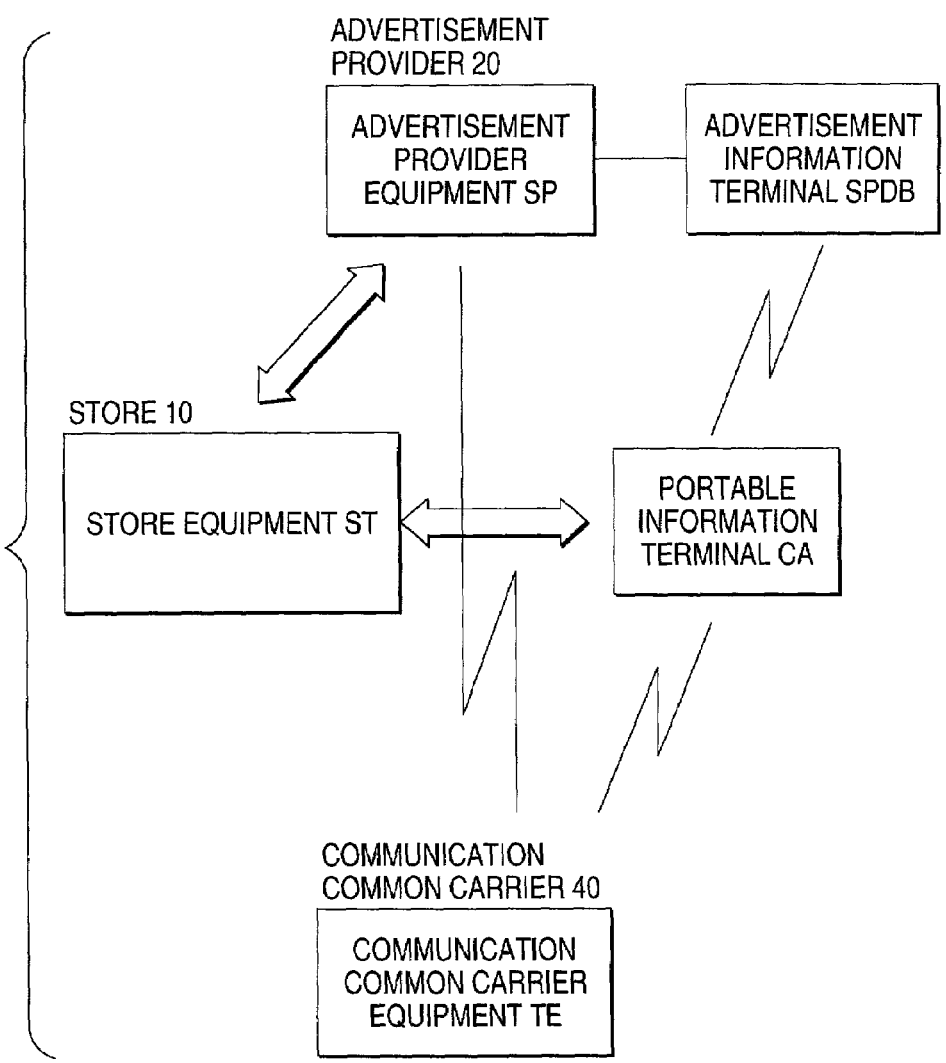
FIG. 15 is a block diagram to show the general configuration of an advertisement information providing system of a third embodiment of the invention.
Figure 16:
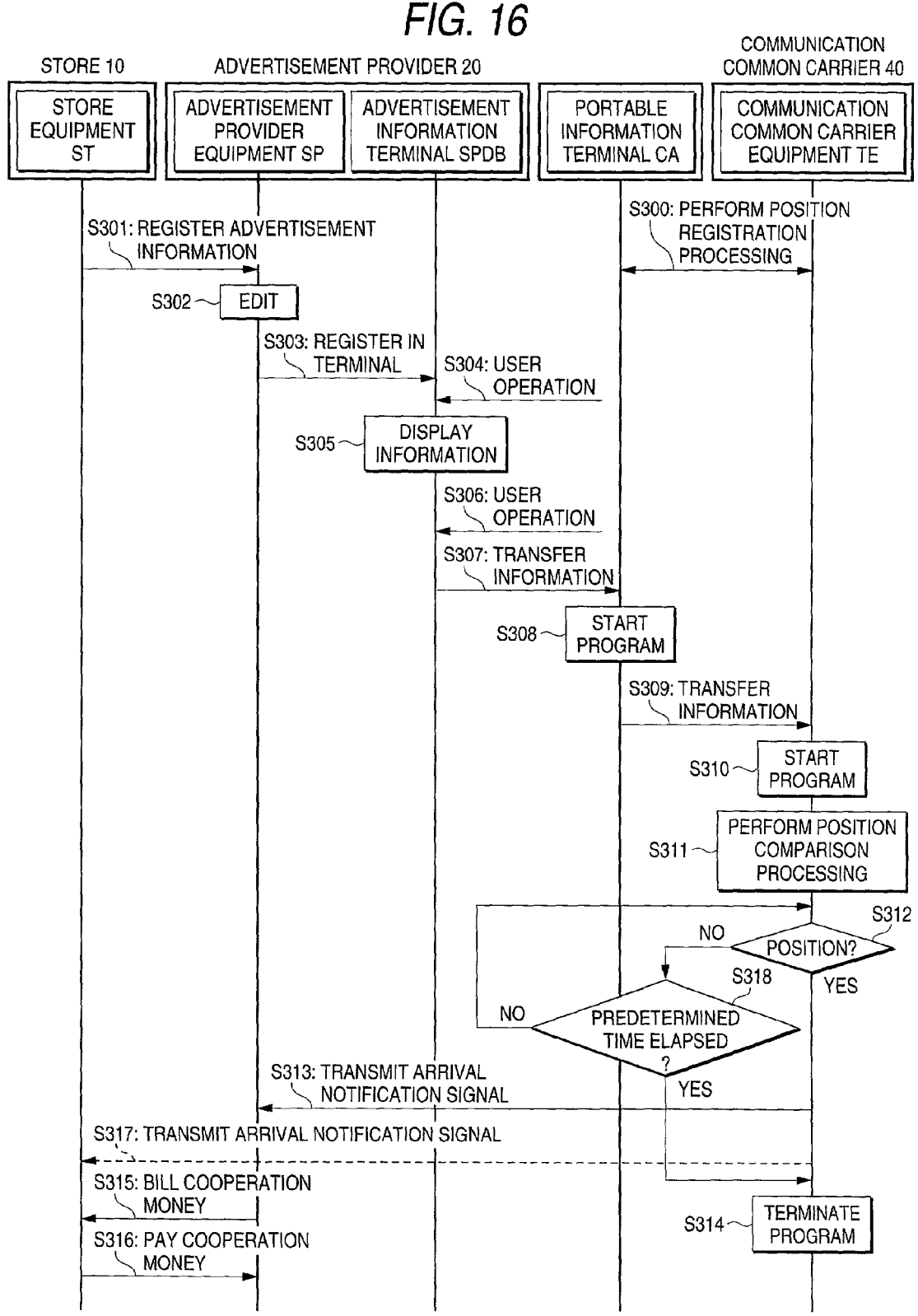
FIG. 16 is a sequence chart cited to describe the operation of the advertisement information providing system of the third embodiment of the invention.
Figure 17:
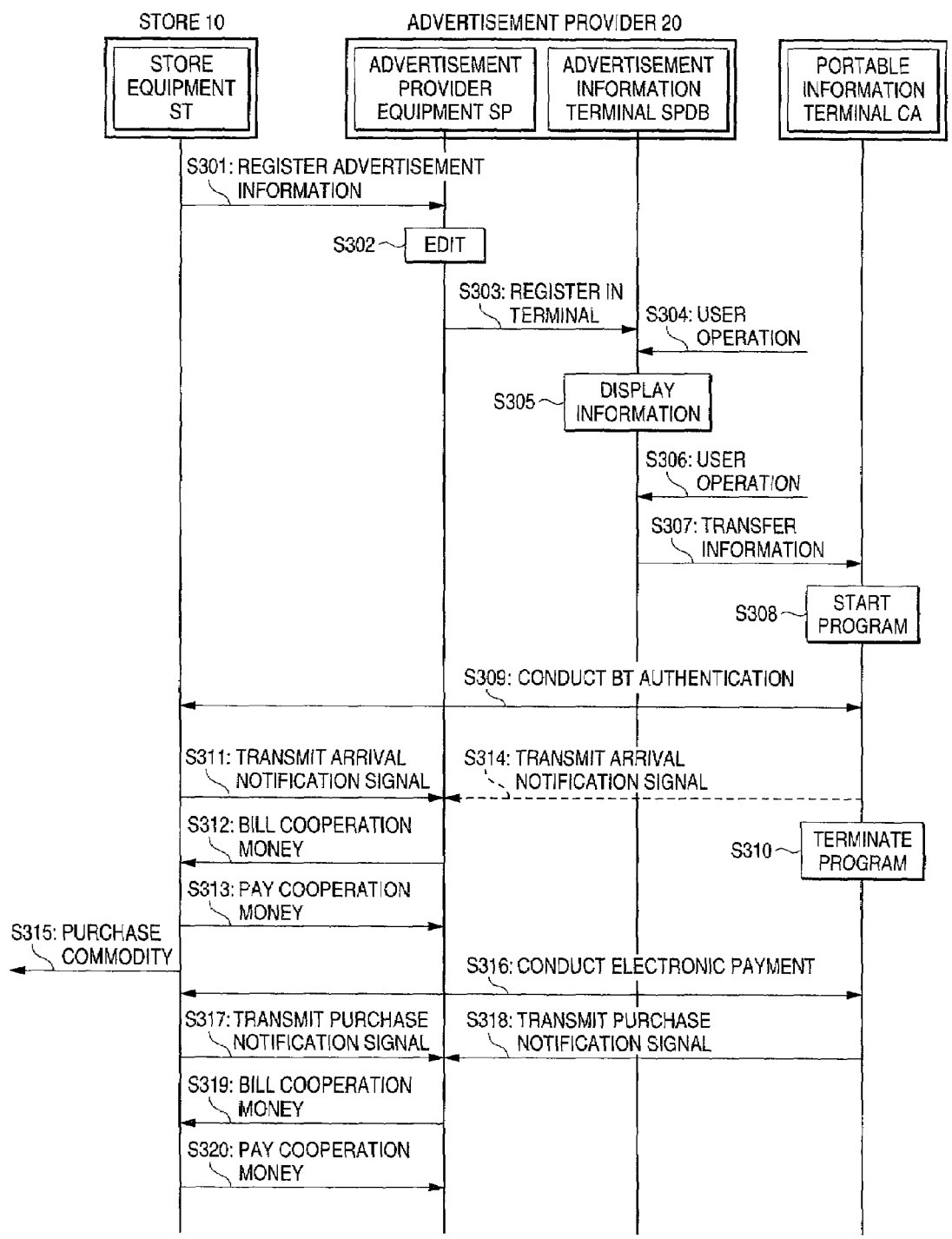
FIG. 17 is a sequence chart cited to describe the operation of advertisement information providing system of a modification of the third embodiment of the invention.

Next, a third embodiment of the invention will be discussed with reference to FIGS. 15 to 17. FIG. 15 is a block diagram to show the general configuration of an advertisement information providing system according to the third embodiment of the invention, and FIGS. 16 and 17 are operation sequence charts to show information providing processing in the advertisement information providing system.

First, the general configuration and the operation of the advertisement information providing system according to the third embodiment will be discussed.

As shown in FIG. 15, the advertisement information providing system S3 of the third embodiment is made up of store equipment ST provided in a store 10, an advertisement providing apparatus SP provided in an advertisement provider 20, an advertisement information terminal SPDB managed by the advertisement provider 20, communication common carrier equipment TE provided in a communication common carrier 40, and a portable information terminal CA making a predetermined contract with the communication common carrier 40.

Blocks identical with or similar to those previously described with reference to the accompanying drawings in the first and second embodiments are denoted by the same reference numerals and will not be discussed in detail again.

For simplicity, one store 10, one advertisement provider 20, one advertisement information terminal SPDB, one communication common carrier 40, and one portable information terminal CA are shown in the figure, but the advertisement information providing system may comprise a plurality of stores, a plurality of advertisement providers, a plurality of advertisement information terminals, a plurality of communication common carriers, and a plurality of portable information terminals as in the embodiment described later.

The store 10 and the advertisement provider 20 have the relationship of supplying information to each other by wired or wireless means or any other means. The advertisement provider 20 and the portable information terminal CA have the relationship wherein a predetermined program described later is started based on the identification number for each store issued by the advertisement provider 20 and the identification number is transmitted to the communication common carrier 40. The advertisement provider 20 and the communication common carrier 40 have the relationship wherein when the identification number for each store issued by the advertisement provider 20 is transmitted via the portable information terminal CA, a predetermined program described later is started and the communication common carrier 40 transmits an arrival notification signal to the advertisement provider 20 at a predetermined timing.

The general operation is as follows:

In the described advertisement information providing system S3, the advertisement provider 20 carries advertisement information of each store in each advertisement information terminal SPDB managed by the advertisement provider 20 and the advertisement information is put into a database with a predetermined identification number assigned for each store. The advertisement information terminal SPDB is installed in a convenient store in a predetermined area in which the store 10 exists, a service area on an expressway, or the like, for example. The user visiting the place where the advertisement information terminal SPDB is installed reads store information stored in the advertisement information terminal SPDB and downloads the store information of the store 10 for the user to visit into his or her portable information terminal CA. To download the store information, radio communication based on Bluetooth can be used.

Then, when the user having the portable information terminal CA visits the store 10, the communication common carrier 40 transmits an arrival notification signal indicating that the user visits the store 10 to the advertisement provider 20, which then collects cooperation money from the store 10 based on the arrival notification signal.

Next, the operation sequence of information providing processing in the advertisement information providing system S3 according to the third embodiment of the invention will be discussed with a flowchart of FIG. 16.

FIG. 16 is a sequence chart cited to describe the operation of the advertisement information providing system S3 of the third embodiment; it shows the operation relationships among the store equipment ST provided in the store 10, the advertisement providing apparatus SP provided in the advertisement provider 20, the advertisement information terminal SPDB managed by the advertisement provider 20, the portable information terminal CA, and the communication common carrier equipment TE provided in the communication common carrier 40.

The information providing processing according to the third embodiment assumes that position registration processing is performed at arbitrary time intervals between the portable information terminal CA owned by the user and the communication common carrier 40 (step S300). A plurality of base stations 401 provided in the communication common carrier equipment TE and the portable information terminals CA mutually perform position registration processing and an information server 403 provided in the communication common carrier equipment TE always monitors the geometrical position information of the portable information terminals CA.

First, the store 10 requests the advertisement provider 20 to carry advertisement information (step S301). When receiving the request, the advertisement provider 20 edits the advertisement information to store the advertisement information in the advertisement information terminal SPDB (step S302) and stores the completed advertisement information in the advertisement information terminal SPDB (step S303). In the sequence chart, only the store 10 is shown, but the advertisement provider 20 may gather advertisements from a plurality of stores and stores the advertisements in the advertisement information terminal SPDB. Also, one store may request more than one advertisement provider 20 to carry an advertisement in the advertisement information terminal SPDB. The advertisement information terminals SPDB are installed in convenience stores, etc., all over the country, for example, and the advertisement provider 20 edits the advertisement information using communication lines.

Next, the user operates the advertisement information terminal SPDB installed in a convenience store, etc., (step S304), whereby the store advertisement information is displayed on a display section 253 of the advertisement information terminal SPDB (step S305). The advertisement information can be displayed in classification by category, by area, etc., for example, and the user can display his or her desired information according to a predetermined operation procedure.

Then, the user selects store information (step S306) and transfers the selected store information to the portable information terminal CA (step S307). At this time, the user may transfer the store information by radio communications based on Bluetooth, for example. The store information is assigned the identification number for each store as in the second embodiment.

As the portable information terminal CA receives the identification number, an information transfer program is started (step S308) and the identification number is transferred to the communication common carrier 40 (step S309).

When the information server 403 provided in the communication common carrier equipment TE of the communication common carrier 40 receives the identification number transmitted from the portable information terminal CA, an arrival notification signal program is started (step S310). This arrival notification program always compares the geometrical position information of the store entered in the identification number with the geometrical position information of the portable information terminal CA (step S311) and when the portable information terminal CA arrives at a point in a predetermined area containing the geometrical position information of the store 10 (YES at step S312), the program sends an arrival notification signal to the advertisement provider 20 (step S313).

Next, when the user visits the store 10 corresponding to the acquired advertisement information, the information server 403 in the communication common carrier equipment TE detects that the portable information terminal CA arrives at a point in a predetermined area containing the geometrical position information of the store 10 (YES at step S312) and sends an arrival notification signal to the advertisement provider 20 (step S313). To recognize the store visited by the user having the portable information terminal CA, the communication common carrier 40 can recognize the store (for example, store 10A) based on the identification number contained in the arrival notification signal.

On the other hand, as the arrival notification signal is transmitted, the communication common carrier 40 terminates the arrival notification program (step S314). That is, when the user visits the store based on the advertisement information stored in the advertisement information terminal SPDB, the role of the program is terminated. Since it is possible that some users do not visit the store although they acquire the advertisement information from the advertisement information terminal SPDB, when a predetermined time has elapsed, the arrival notification program may be terminated, as described later.

Next, the advertisement provider 20 receiving the arrival notification program derives the store information from the identification number superposed on the arrival notification signal and bills the advertisement charge as the cooperation money for the store (step S315). The store 10 pays the cooperation money based on the billed amount of money (step S316).

Since the store 10 cannot recognize that the reason why the user visits the store is that he or she sees the advertisement information stored in the advertisement information terminal SPDB, the communication common carrier 40 may also transmit the arrival notification signal to the store 10 as at step S317. At the time, the arrival notification program may contain a transmission program to the store.

On the other hand, the information server 403 in the communication common carrier equipment TE always compares the geometrical position information of the store with the geometrical position information of the portable information terminal CA (step S311). If the portable information terminal CA does not enter the predetermined area containing the geometrical position information of the store 10 although a predetermined time has elapsed after the program was started (YES at step S318), it is advisable to terminate the program (step S314).

This is a measure taken if the user cancels going to the setup store 10.

As described above, in the advertisement information providing system S3 of the third embodiment according to the invention, when the user acquiring the advertisement information from the advertisement information terminal SPDB visits the store 10, the store 10 pays the cooperation money to the advertisement provider 20, so that the advertisement provider 20 can get enormous cooperation money as the advertisement information terminal SPDB stores advertisements of a large number of stores, and it is made possible to make reduction in the advertisement charge accordingly. The system is reasonable for the store 10 because the store 10 pays the cooperation money to the advertisement provider 20 introducing the user acquiring information from the advertisement information terminal SPDB into the store, and if the advertisement charge becomes low, it is made possible for the store to furthermore request the advertisement provider to carry advertisements in the advertisement information terminal SPDB.

In the embodiment, the communication common carrier 40 recognizes the position of the portable information terminal CA. If a GPS receiver 458 is installed in the portable information terminal CA, the programs at steps 310 to 314 and S317 and S318 may be contained in the portable information terminal CA.

Modification of Third Embodiment

Next, a modification of the third embodiment according to the invention will be discussed with reference to FIG. 17.

A sequence chart of FIG. 17 is a modification of the sequence chart of the advertisement information providing system S3 of the second embodiment shown in FIG. 16.

The advertisement information providing system S3 in the modified embodiment is a system wherein when the user visits the store 10 based on advertisement information acquired from the advertisement information terminal SPDB, the portable information terminal CA owned by the user and the store 10 communicate with each other for Bluetooth authentication, the store sends an arrival notification signal to the advertisement provider 20 and pays the cooperation money to the advertisement provider 20. In the system, when the user purchases a commodity in the store 10, the store 10 also pays the cooperation money to the advertisement provider 20 as described in the modification of the second embodiment.

FIG. 17 is a sequence chart cited to describe the operation of the advertisement information providing system S3 of the modification of the third embodiment; it shows the operation relationships among the store equipment ST provided in the store 10, the advertisement providing apparatus SP provided in the advertisement provider 20, the advertisement information terminal SPDB managed by the advertisement provider 20, and the portable information terminal CA. In the sequence chart, steps S301 to S307 identical with those previously described with reference to FIG. 16 will not be discussed again.

When the user transfers advertisement information to the portable information terminal CA at step S307, a Bluetooth authentication program is started in the portable information terminal CA (step S308) That is, in the modified embodiment, the machine address of a Bluetooth transmission/reception section 105 provided in the store equipment ST in the store 10 is added to the identification number of the store 10 and when it becomes possible for the Bluetooth authentication program to communicate with the Bluetooth transmission/reception section 105 assigned the machine address, Bluetooth authentication is conducted (step S309) and then the identification number is sent to the store 10, which then transmits an arrival notification signal to the advertisement provider 20 based on the identification number (step S311).

For example, if the user downloads the store information of the store 10A into the portable information terminal CA, when the user having the portable information terminal CA visits the store 10A, the Bluetooth transmission/reception section 105 installed in the store 10A and a Bluetooth transmission/reception section 459 of the portable information terminal CA communicate with each other for automatically conducting Bluetooth authentication and the store 10 transmits an arrival notification signal to the advertisement provider 20 based on the authentication result. The portable information terminal CA may transmit the arrival notification signal to the advertisement providing apparatus SP (step S314).

Next, the advertisement provider 20 receiving the arrival notification program derives the store information from the identification number superposed on the arrival notification signal and bills the cooperation money for the store (step S312). The store 10 pays the cooperation money based on the billed amount of money (step S313).

Further, if the user purchases a commodity in the store 10 (step S315), in the modified embodiment, electronic payment processing is conducted (step S316). To do this, for example, the Bluetooth transmission/reception section 459 provided in the portable information terminal CA and a radio transmission/reception section 104 placed in the store 10 are connected by radio communications and an electronic payment processing section 103 placed in the store performs the electronic payment processing.

When the electronic payment processing is performed, the store 10 transmits a purchase notification signal to the advertisement provider 20 (step S317). As for the purchase notification signal, a predetermined agreement is made between the store 10 and the advertisement provider 20 and such a program to transmit the identification number from the portable information terminal CA of the user when electronic payment is made based on purchase of a commodity is set and the store 10 is programmed so as to transmit the purchase notification signal to the advertisement provider 20 based on reception of the identification number.

The portable information terminal CA may transmit the purchase notification signal to the advertisement provider 20 at the electronic payment time (step S318).

Next, the advertisement provider 20 receiving the purchase notification program derives the store information from the identification number superposed on the purchase notification signal and bills the cooperation money for the store (step S319). The store 10 pays the cooperation money based on the billed amount of money (step S320).

As described above, in the advertisement information providing system S3 according to the modification of the third embodiment according to the invention, when the user acquiring the advertisement information from the advertisement information terminal SPDB visits the store 10, the store 10 pays the cooperation money to the advertisement provider 20, so that the advertisement provider 20 can get enormous cooperation money (running cost) as the advertisement information terminal SPDB stores advertisements of a large number of stores, and it is made possible to make reduction in the advertisement charge accordingly. The system is reasonable for the store 10 because the store 10 pays the cooperation money to the advertisement provider 20 introducing the user acquiring information from the advertisement information terminal SPDB into the store if the user purchases a commodity in the store, and if the advertisement charge becomes low, it is made possible for the store to furthermore request the advertisement provider to carry advertisements in the advertisement information terminal SPDB. The user can use the portable information terminal CA to easily set the store as the destination and thus is relieved of burdensome setting operation.

In the modification of the third embodiment, the paying steps of the cooperation money based on the purchase notification signal (steps S313 to S318) may be skipped.

That is, the cooperation money may be paid only if the user with the portable information terminal visits the corresponding store.

As described above, the invention according to the first to third embodiments is characterized by the fact that when the user acquiring the advertisement information for each store 10 published by the advertisement provider 20 visits the store or purchases a commodity in the store, the store pays the cooperation money to the advertisement provider. For example, the current position recognition function for navigation or the current position recognition function of a portable information terminal is used as the means for detecting the fact that the user acquiring the advertisement information visits the store. The electronic payment function is used as means for detecting the fact that the user purchases a commodity in the store.

The described embodiments of the invention assume that the store 10 is a terminal, that the advertisement provider 20 is a server, and that the user owns a navigation terminal including a portable information terminal, but the invention is not limited to the assumption and can be embodied by using terminals having a considerable processing performance at the minimum. An open network such as the Internet is used as the communication infrastructure for connecting the advertisement provider server, the store terminal, and the user terminal, but the communication infrastructure is not limited either.

Fourth Embodiment

Figure 18:
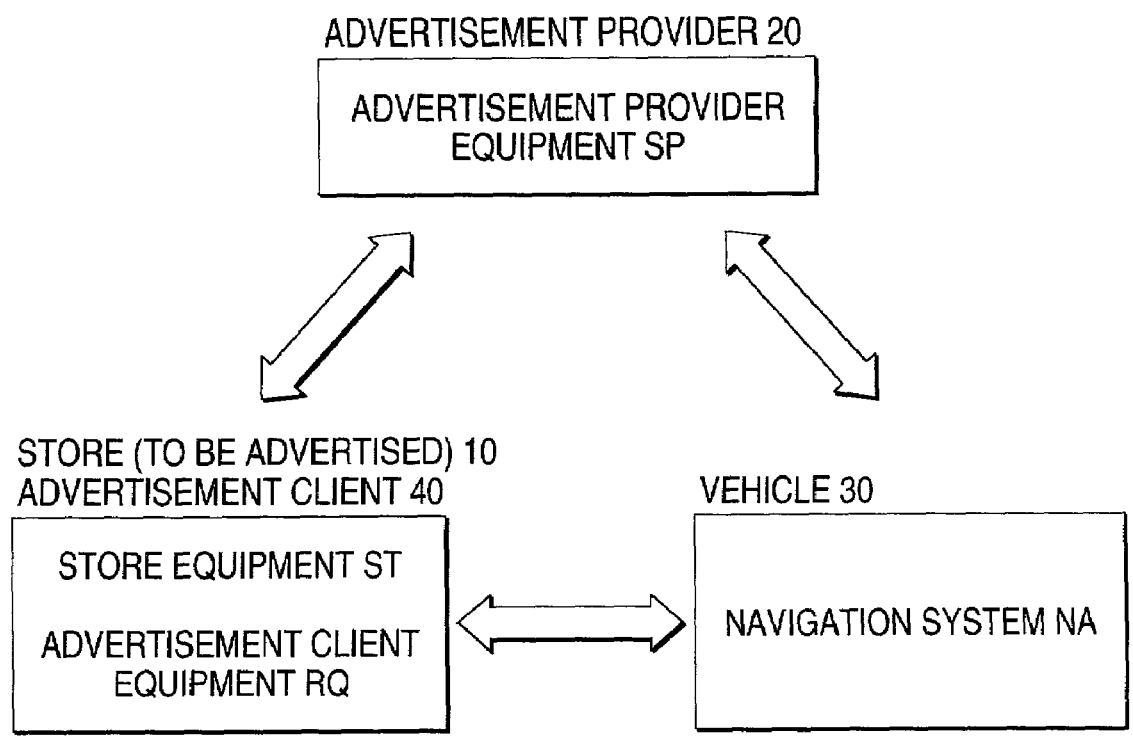
FIG. 18 is a block diagram to show the general configuration of an advertisement information providing system according to an embodiment of the invention.
Figure 19:
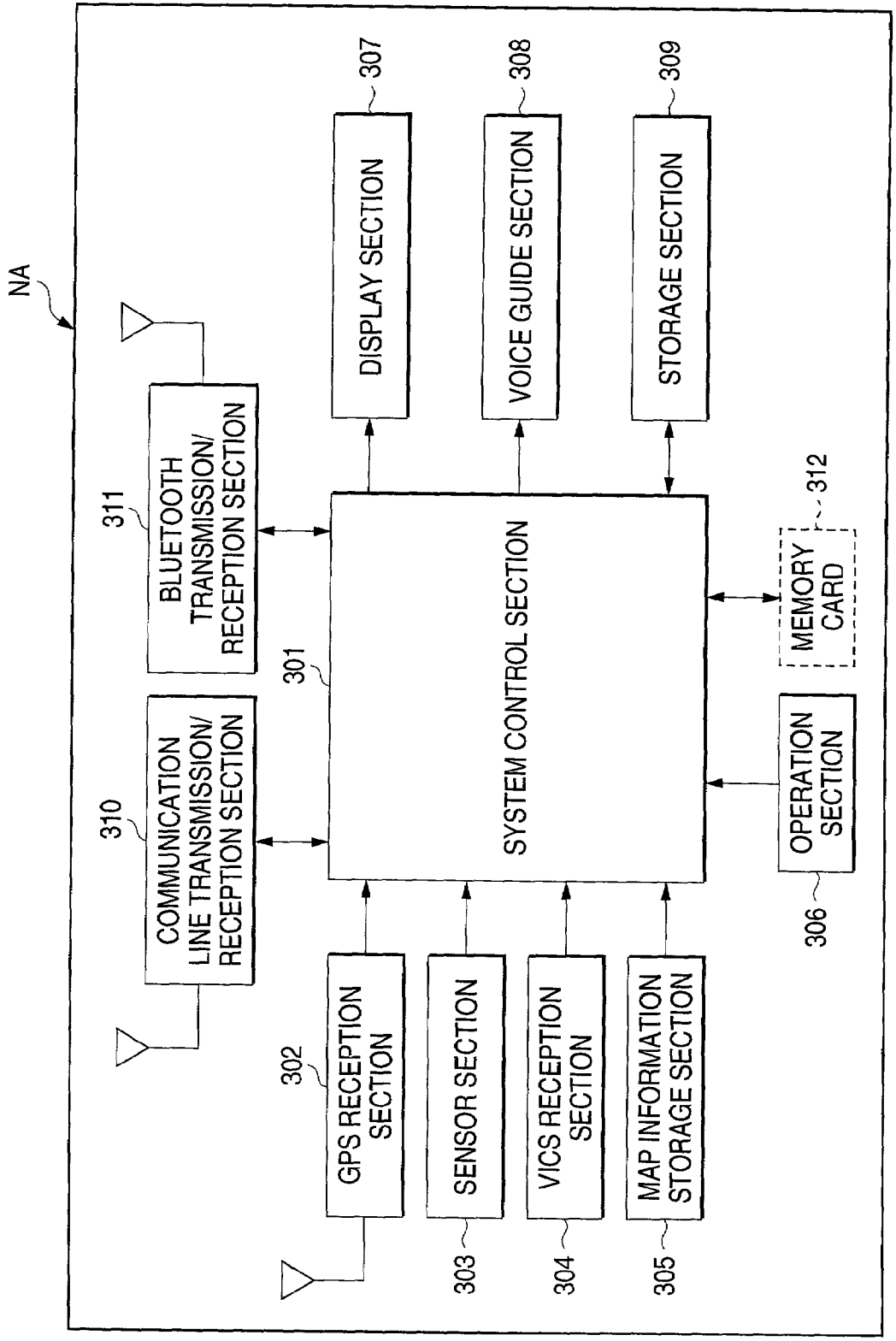
FIG. 19 is a block diagram to show the configuration of a navigation system used with the embodiment of the invention.
Figure 20:
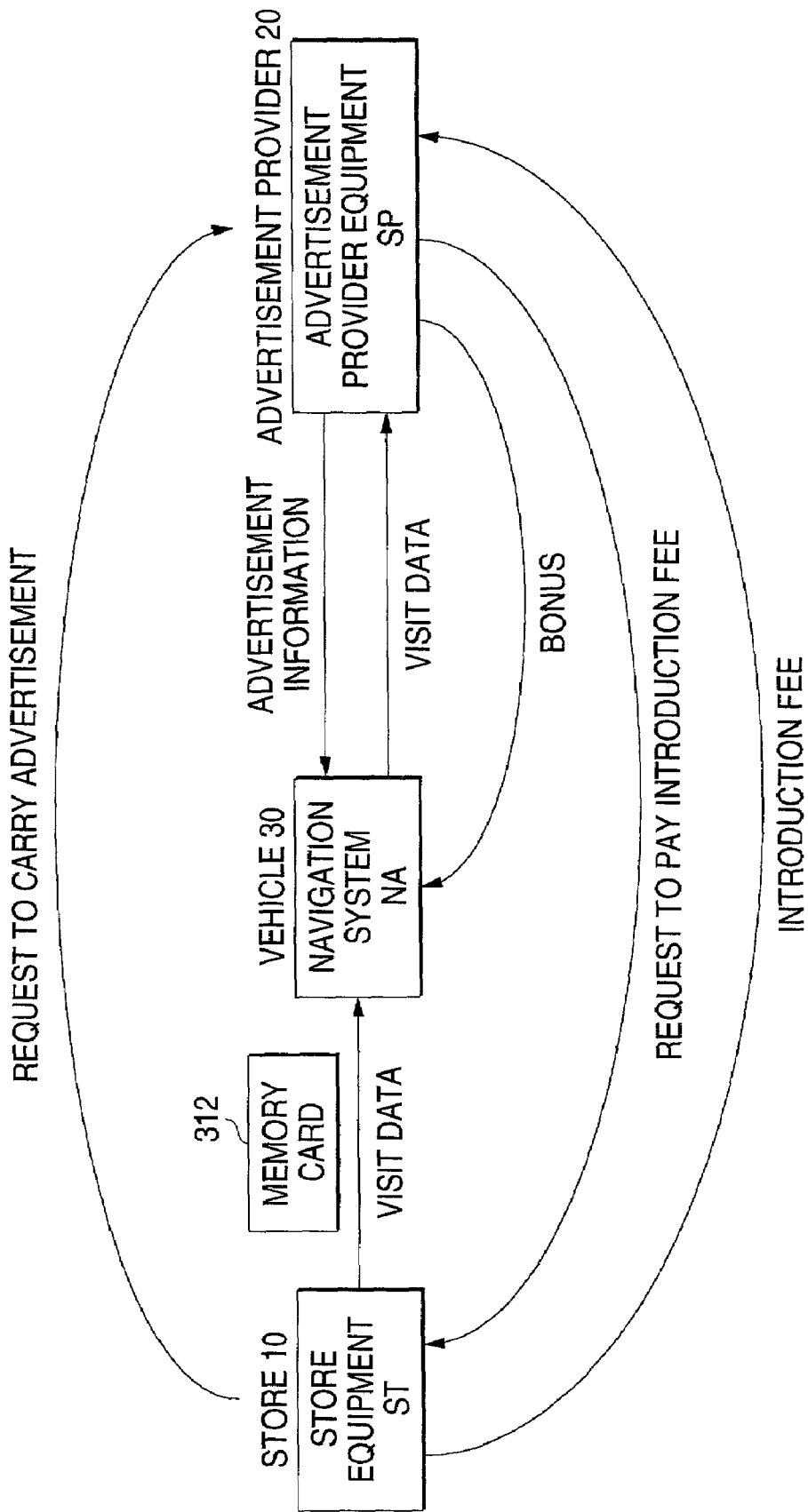
FIG. 20 is an operation schematic representation to show a flow of information, etc., in an advertisement information providing system of a fourth embodiment of the invention.
Figure 21:
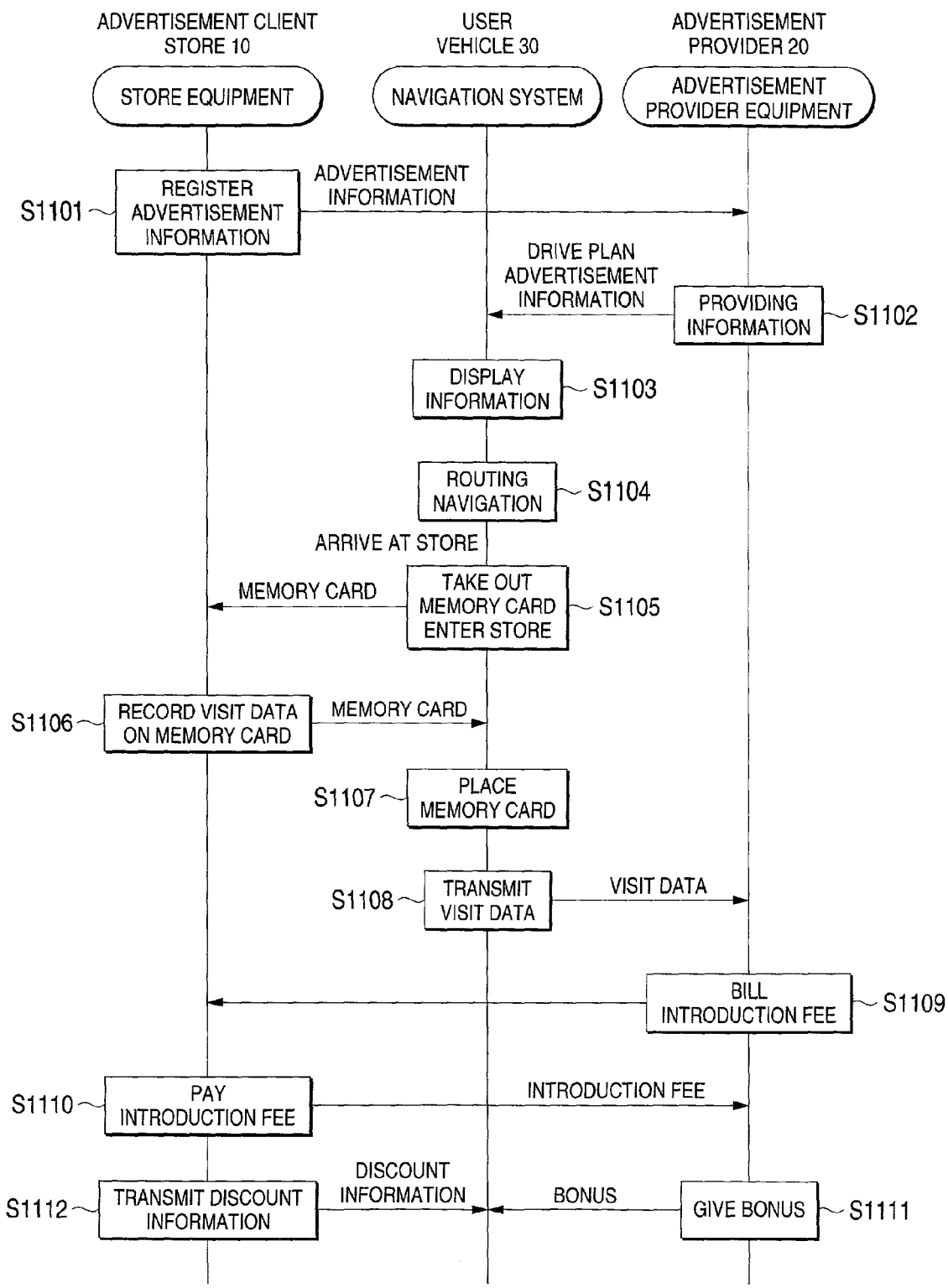
FIG. 21 is an operation sequence chart to show information providing processing in the advertisement information providing system of the fourth embodiment of the invention.

An advertisement information providing system according to a fourth embodiment follows. FIG. 18 is a block diagram to show the general configuration of an advertisement information providing system according to an embodiment of the invention. FIG. 19 is a block diagram to show the configuration of a navigation system used with the embodiment. FIG. 20 is an operation schematic representation to show a flow of information, etc. FIG. 21 is an operation sequence chart to show information providing processing in the advertisement information providing system of the fourth embodiment.

As shown in FIG. 18, the advertisement information providing system of the embodiment is made up of store equipment ST provided in the installation of a store 10 to be advertised, an advertisement providing apparatus SP provided in the installation of an advertisement provider 20, and a navigation system NA as an information terminal provided in a vehicle 30 used by the user of the advertisement information providing service.

The embodiment shows an example wherein the store 10 and the store equipment ST also serve as an advertisement client 40 and advertisement client equipment RQ respectively, but they may be separate. The equipment ST or SP may be placed in a remote location via a communication line rather than in the installation. The advertisements may be applied not only to stores, but also to various objects such as commercial installations as a complex of stores, etc., amusement installations of amusement parks, zoos, etc., tourist installations of lakes, waterfalls, etc., play facilities, sports facilities, culture facilities of theaters, art museums, etc., and overnight accommodations.

As the navigation system NA, not only a vehicle-installed terminal placed in the vehicle 30, but also a portable terminal that can be carried by the user can be used. Further, for simplicity, one store 10, one advertisement provider 20, and one vehicle 30 are shown in the figure, but the advertisement information providing system may comprise a plurality of stores, a plurality of advertisement providers, and a plurality of vehicles.

The store 10 and the advertisement provider 20 transfer information, etc., to each other by wired or wireless means or any other means. The advertisement provider 20 and the navigation system NA in the vehicle 30 are connected by wireless communication means, etc., of a mobile communication system such as a mobile telephone for transferring information, etc., to each other. For example, advertisement information provided by the advertisement provider 20 is displayed on a display section of the navigation system NA. Routing and guide of the vehicle 30 into the destination (in this case, the store 10) (navigation processing) are performed based on the advertisement information taken into the navigation system NA.

In addition to distributing the advertisement information to the navigation system NA by wireless communications and displaying the advertisement information on the display section, the advertisement information may be provided by any other medium such as an information magazine. In this case, the user performs input operation, places a medium, accesses the advertisement information through a communication line, etc., and connects to another machine, thereby taking the information concerning store advertisement into the navigation system NA.

As shown in FIG. 19, the navigation system NA is made up of a system control section 301 for shouldering the system nucleus, a GPS (Global Positioning System) reception section 302, a sensor section 303 including a distance sensor for detecting the move distance and speed of the vehicle, an angle sensor for detecting the turn angle of the vehicle, and the like, a VICS (Vehicle Information Communication System) reception section 304, a map information storage section 305, an operation section 306 also serving as a data input section, a display section 307 implemented as a liquid crystal display, etc., a voice guide section 308 including a voice amplifier, a loudspeaker, and the like, a storage section 309 for temporarily storing input information, etc., a communication line transmission/reception 310 for transmitting and receiving various pieces of information other than the above by wired or wireless communication means, a Bluetooth transmission/reception section 311 for transmitting and receiving a signal based on Bluetooth of a signal transmission system using a feeble radio wave of a 2.4-GHz band requiring no license, and a detachable and carriable memory card 312 for storing information.

The GPS reception section 302 receives navigation radio waves from a plurality of GPS satellites and generates a GPS signal containing current position information, etc., of the vehicle based on position information, etc., contained in the received signals and outputs the GPS signal to the system control section 301. On the other hand, the sensor section 303 generates a position signal indicating the current position of the vehicle autonomously found based on the detection results of the sensors contained in the sensor section 303 (namely, the current position found by integrating the move distance with the starting point as the origin and the move direction) and outputs the position signal to the system control section 301.

Thus, the system control section 301 mainly uses the current position indicated by the position signal and detects the current position of the vehicle while correcting the current position based on the current position information, etc., indicated by the GPS signal, and outputs the corrected position to the display section 307 as a display signal. A position mark, etc., indicating the detected current position together with map information is displayed on a display screen of the display section 307.

On the other hand, the VICS reception section 304 receives VICS information containing traffic congestion information transmitted from the VICS, generates a VICS signal containing the traffic congestion information, etc., and outputs the VICS signal to the system control section 301.

The map information storage section 305 made up of a DVD-ROM (DVD-Read Only Memory) drive, a hard disk drive, etc., collectively stores map information displayed on the display section 307 and used for navigation processing, searches necessary map information, generates a map signal, and outputs the map signal to the system control section 301.

When the user operates the operation section 306 as required to execute navigation processing, the operation section 306 generates an operation signal corresponding to the operation performed by the user and outputs the operation signal to the system control section 301.

Based on the display signal output from the system control section 301, the display section 307 displays information required for navigation processing for the user. At this time, the information displayed on the display section 307 includes text information for move guide, time information of the arrival scheduled time, the current time, etc., state information, etc., indicating the reception state of the GPS radio wave, and the like as well as the map information stored in the map information storage section 305. The voice guide section 308 synthesizes a guide voice, etc., required for navigation processing based on a voice control signal from the system control section 301 and emits a sound in the vehicle.

Concurrently with processing of the components, the system control section 301 totally controls various types of processing including reading and display control of the map information, display control of the position mark and any other information, output control of guide voice, etc., and route guide processing.

The storage section 309 is storage means implemented as memory such as RAM for storing user-registered destination information and point information, etc. The memory card 312 is a detachable card storage medium containing a storage device such as flash memory, etc., and having an interface of a predetermined general-purpose format or a unique format and stores visit data indicating the actual visit of a store, etc., and the like. As the memory card 312, a card having an identity authentication function such as an SIM card (Subscriber Identity Module Card), a credit payment function, etc., may be used.

The communication line transmission/reception 310 forms a communication interface section for accessing and acquiring information provided by the advertisement provider 20, information on the Internet, etc., for example, and conducts data communications for acquiring various pieces of information, area information, etc., required for navigation processing. The communication line transmission/reception 310 is also used to connect the navigation system NA to any other communication machine such as a portable information terminal that the user, etc., has. The Bluetooth transmission/reception 311 transmits and receives a radio wave to and from a Bluetooth transmission/reception section installed in another terminal for transferring a signal.

Next, the operation of the advertisement information providing system of the fourth embodiment of the invention will be discussed with FIGS. 20 and 21.

In the fourth embodiment, as shown in FIG. 20, first the store 10 requests the advertisement provider 20 to carry an advertisement and registers advertisement information. The advertisement provider 20 distributes the advertisement information to the navigation system NA of the vehicle 30 of the user from the advertisement providing apparatus SP. Accordingly, the advertisement information is displayed on the display screen of the display section 307 and is guided in voice by the voice guide section 308. The advertisement information may be displayed arbitrarily on the display screen of the display section 307 or when the user touches a store, etc., on a map displayed on the display screen as a touch panel or specifies the store, etc., through the operation section 306, the advertisement information corresponding to the store may be displayed and discount information, handled commodities, a menu, and the like in the store, etc., may be displayed. At this time the user references the route information, map information, advertisement information, etc., distributed from the outside or stored in the system for routing and arrives at the store 10 of the destination as the user is guided by the navigation system NA.

The user takes out the memory card 312 placed in the navigation system NA and inserts the memory card 312 into a terminal of the store equipment ST, etc., for connecting to the store equipment ST directly or through a wireless interface, etc., whereby visit data implemented as a unique number, code, etc., containing store identification information indicating the actual visit to the store is written onto the memory card 312. Before or after the visit data is recorded, advertisement providing data indicating that the advertisement information has been provided, position data based on the GPS, and the like are written onto the memory card 312.

When the user inserts the memory card 312 onto which the visit data is written into the navigation system NA, the visit data is transferred to the advertisement providing apparatus SP of the advertisement provider 20 by wireless communications. As the visit data is transmitted, the advertisement providing apparatus SP requests the store 10 to pay the introduction fee corresponding to the fee of providing the advertisement, and the store 10 pays the introduction fee to the advertisement provider 20 in response to the request. For processing of billing and paying the introduction fee, means selected appropriately in response to the system configuration, the use state, etc., such as electronic payment over a communication line of a network, etc., may be used.

The advertisement providing apparatus SP gives some bonus to the user of the navigation system NA in return for transmitting the visit data. Various bonuses for using the advertisement are possible, for example, in such a manner that the communication charge between the navigation system NA and the advertisement providing apparatus Sp is reduced, that the charge using the store, etc., is reduced, or that points for receiving various services are added.

As described above, the navigation system NA of an information terminal has functions of advertisement showing means, a guide section, and visit data transmission means as claimed in claims. The advertisement providing apparatus SP has functions of advertisement distribution means, reception means, billing means, and bonus giving means as claimed in claims. The store equipment ST of the advertisement client equipment has a function of visit data transmitter.

The advertisement information providing processing in the fourth embodiment will be discussed in more detail with reference to an operation sequence chart of FIG. 21.

To begin with, the store 10 of an advertisement client requests the advertisement provider 20 to carry an advertisement and transmits advertisement information to the advertisement providing apparatus SP, thereby registering the advertisement information (step S1101). To transmit the advertisement information, various means responsive to the system configuration, the use state, etc., such as data transmission, etc., over a communication line of a network, a public switched telephone line, etc., from the store equipment ST to the advertisement providing apparatus SP may be used.

When receiving the advertisement information, the advertisement providing apparatus SP of the advertisement provider 20 transmits various pieces of information containing the advertisement information processed as required to the navigation system NA of the vehicle 30 used by the user of the advertisement information providing service and provides information for the user (step S1102). For example, a drive plan created based on route information and the registered advertisement information are shown in combination. In the navigation system NA, the provided information such as the advertisement information and the drive plan received through the communication line transmission/reception 310 is displayed on the display screen of the display section 307 and a voice is output by the voice guide section 308, thereby guiding information (step S1103).

The user receiving the advertisement information and the drive plan operates the operation section 306 of the navigation system NA for selection, whereby routing processing to the destination is performed. For example, an appropriate route for the user seeing the advertisement information to go to the store being advertised is set on the map. Then, the navigation system NA executes navigation processing following the routing (step S1104). In routing in the navigation system NA, for the user to see an advertisement carried in any other medium such as an information magazine and visit the store, the user enters advertisement code, etc., by operating the operation section 306. The advertisement information and the drive plan distributed by the advertisement provider 20 may be taken into the navigation system NA by using an information record medium such as a DVD-ROM in the map information storage section 305 or the memory card 312. While the vehicle 30 is being moved, etc., advertisement information of a store, etc., in the vicinity of the current position of the navigation system NA may be provided whenever necessary from among the registered advertisement information.

When the user riding in the vehicle 30 is guided following the routing by the navigation processing of the navigation system NA and arrives at the store 10 or the vicinity thereof, the user takes out the memory card 312 from the navigation system NA and enters the store 10 with the memory card 312 (step S1105) When the user inserts the memory card 312 into a terminal of the store equipment ST, etc., for connecting to the store equipment ST, the store equipment ST writes visit data containing a unique number, code, etc., indicating the actual visit of the user seeing the advertisement to the store onto the memory card 312 (step S1106). When the advertisement information is displayed and routing is executed in the navigation system NA, for example, advertisement providing data indicating that the advertisement information has been provided, position data based on the GPS, and the like are written onto the memory card 312, and the visit data is recorded corresponding to the data.

The user places the memory card 312 on which the visit data is recorded in the navigation system NA (step S1107). Accordingly, the navigation system NA reads the visit data together with the position data, the advertisement providing data, etc., from the memory card 312 and transmits the data to the advertisement providing apparatus SP of the advertisement provider 20 by wireless communications through the communication line transmission/reception 310 (step S1108). When the transmitted visit data is received in the advertisement providing apparatus SP, the advertisement provider 20 requests the store 10 to pay the introduction fee corresponding to the fee of providing the advertisement (step S1109). The store 10 pays the introduction fee to the advertisement provider 20 in response to the request (step S1110).

When the visit data is transferred from the navigation system NA to the advertisement providing apparatus SP, the advertisement provider 20 gives some bonus to the user of the navigation system NA in return for providing the visit data (step S1111). The store 10 may transmit discount information at the next using time to the user visiting the store as a bonus (step S1112).

Thus, in the fourth embodiment, the user arrives at the store 10 being advertised as he or she is guided by the navigation system NA and in the store 10, the visit data indicating the actual visit of the user seeing the advertisement to the store 10 is recorded on the memory card 312 and the memory card 312 is placed in the navigation system NA, whereby the visit data is transmitted to the advertisement providing apparatus SP of the advertisement provider 20. Accordingly, the advertisement provider 20 and the store 10 of the advertisement client can totalize the visit data, thereby easily keeping track of the effect of the advertisement. At this time, the store 10 needs only to record the visit data on the memory card 312 and can save time and effort of user registration, password entry, etc., so that the advertisement information providing system can be easily introduced and operated.

If the user transmits the advertisement providing data indicating that the advertisement information has been provided, the position data based on the GPS of the navigation system NA, history information at the guiding time by navigation processing, the ID information of the user of the navigation system NA, etc., together with the visit data acquired by the user going to the store being advertised, it proves that reliably the user has seen the advertisement and visited the store corresponding thereto, so that the data can be prevented from being abused or tampered and the reliability of the system can be enhanced.

The introduction fee of the advertisement is paid as the user transmits the visit data, whereby the store can pay the advertisement charge responsive to the advertisement effect. Thus, the advertisement charge when an advertisement is requested to be carried can be reduced (free in some cases) and it is made possible to collect and pay the proper and reasonable advertisement charge as much as the actual advertisement effect provided after the advertisement is carried. Therefore, even a small-scaled store involving a small budget need not risk a large amount of advertisement costs for an advertisement whose effect cannot clearly be known previously and needs to pay the introduction fee of the advertisement only with respect to the number of times each user contributing to sales has visited the store, so that fruitless expenses can be suppressed.

A bonus such as a reduction in the communication charge, the use charge, etc., is given to the user in response to transmission of the visit data, whereby the user can get beneficial information and value and thus user's willingness to provide the visit data can be enhanced and the information of the advertisement effect in more conformity with the real state can be collected.

Fifth Embodiment

Figure 22:
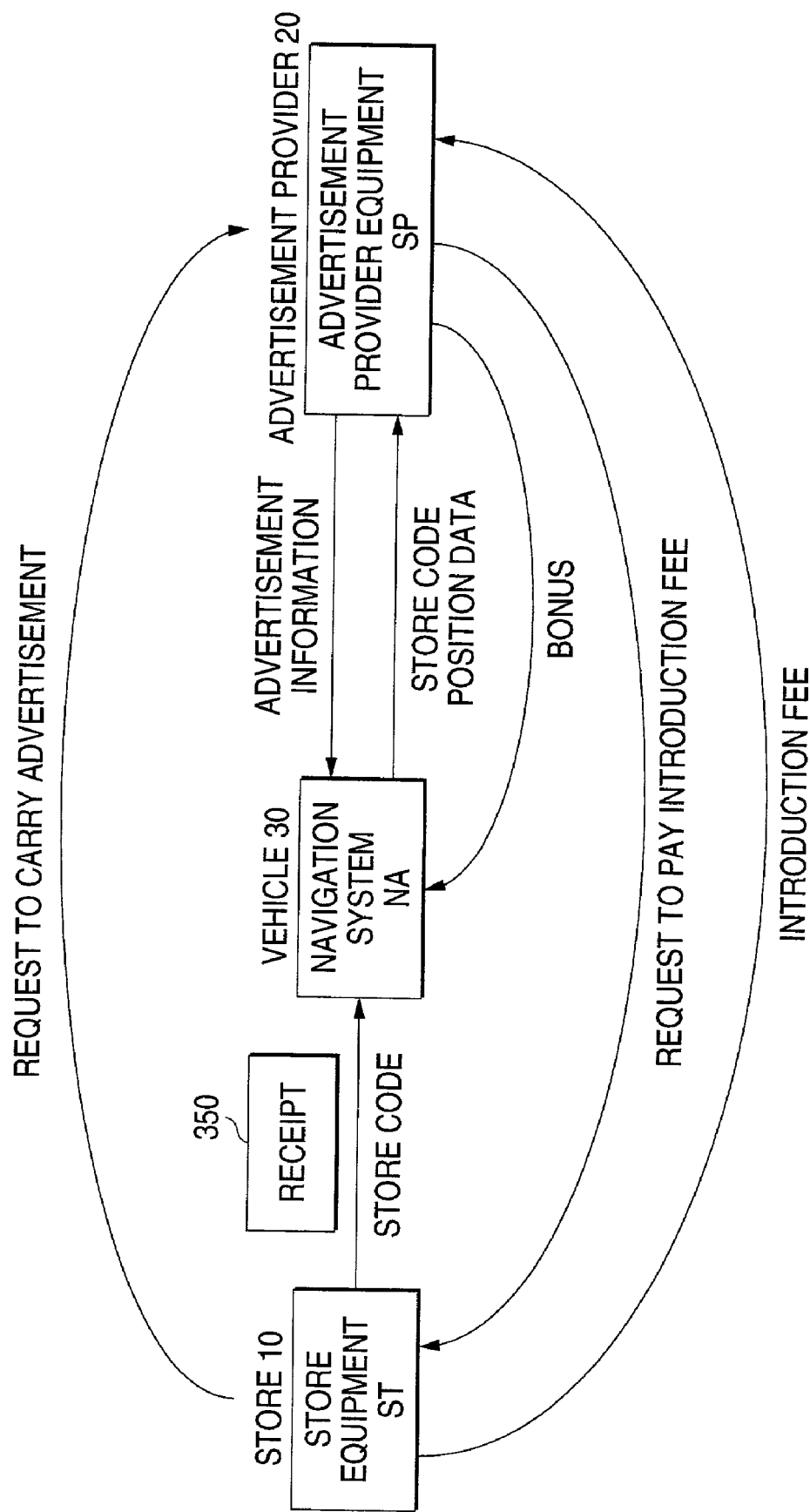
FIG. 22 is an operation schematic representation to show a flow of information, etc., in an advertisement information providing system of a fifth embodiment of the invention.
Figure 23:
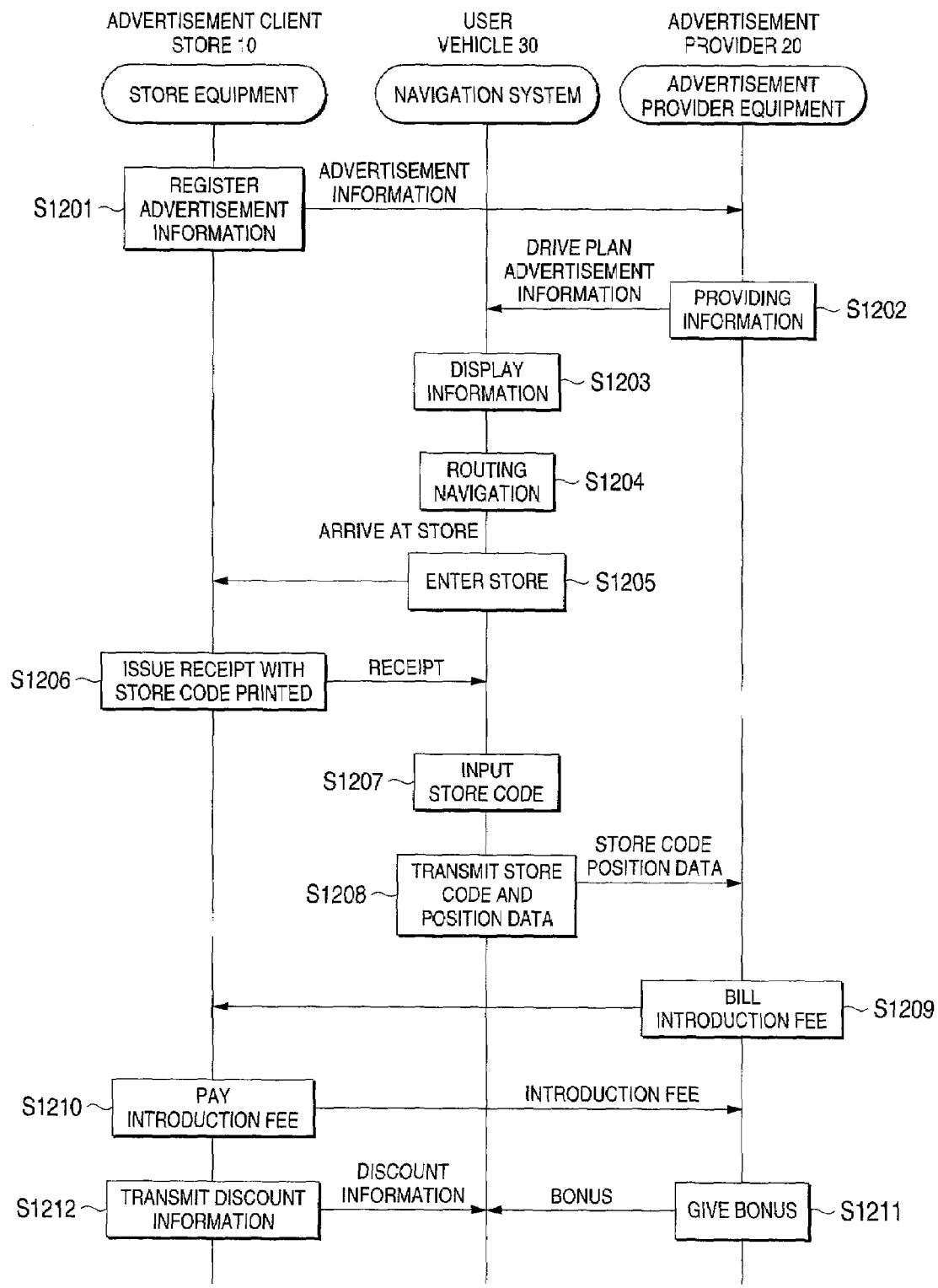
FIG. 23 is an operation sequence chart to show information providing processing in the advertisement information providing system of the fifth embodiment of the invention.

FIG. 22 is an operation schematic representation to show a flow of information, etc., in an advertisement information providing system of a fifth embodiment of the invention and FIG. 23 is an operation sequence chart to show information providing processing in the advertisement information providing system of the fifth embodiment of the invention.

The fifth embodiment is an example wherein the procedure of transferring visit data in the advertisement information providing system is changed, and the system configuration of the fifth embodiment is similar to that of the fourth embodiment previously described with reference to FIGS. 18 and 19 and therefore will not be discussed again. The operation concerning advertisement information providing processing will be discussed with FIGS. 22 and 23.

In the fifth embodiment, as shown in FIG. 22, first a store 10 requests an advertisement provider 20 to carry an advertisement and registers advertisement information. The advertisement provider 20 distributes the advertisement information to a navigation system NA of a vehicle 30 of the user from an advertisement providing apparatus SP. Accordingly, the advertisement information is displayed on a display screen of a display section 307 and is guided in voice by a voice guide section 308. At this time, the user references the route information, map information, advertisement information, etc., distributed from the outside or stored in the system for routing and arrives at the store 10 of the destination as the user is guided by the navigation system NA.

If the user takes action for providing some advertisement effect for the store 10 in such a manner that the user enters the store or purchases a commodity and contributes to sales, etc., after the user enters the store, the user receives a store code (advertisement object code) implemented as a unique number, code, etc., containing store information, etc., indicating the actual visit of the user seeing the advertisement information to the store 10 from the store 10. For example, the user receives a receipt 350 on which the account result is written with the store code printed. The user may receive a card on which the store code is printed, etc.

If the user uses an operation section 306, etc., of the navigation system NA to enter the store code by manual operation or in voice, visit data containing the store code, position data based on the GPS, and the like is transferred to the advertisement providing apparatus SP of the advertisement provider 20 by wireless communications. In this case, transmitting the position data together with the store code results in more reliable proof of the user actually visiting the store. As the visit data is transmitted, the advertisement providing apparatus SP requests the store 10 to pay the introduction fee corresponding to the fee of providing the advertisement, and the store 10 pays the introduction fee to the advertisement provider 20 in response to the request. For processing of billing and paying the introduction fee, means selected appropriately in response to the system configuration, the use state, etc., such as electronic payment over a communication line of a network, etc., may be used.

The advertisement providing apparatus SP gives some bonus to the user of the navigation system NA in return for transmitting the visit data. In this case, to stimulate entering the store code by the user, a cumbersome step for the user, preferably the advertisement provider 20 bears the communication charge from the navigation system NA to the advertisement providing apparatus SP. Various bonuses for using the advertisement are possible in such a manner that the charge using the store, etc., is reduced or that points for receiving various services are added.

As described above, the navigation system NA of an information terminal has functions of advertisement showing means, a guide section, a data input section, and visit data transmission means as claimed in claims. The advertisement providing apparatus SP has functions of advertisement distribution means, reception means, billing means, and bonus giving means as claimed in claims. Store equipment ST of advertisement client equipment has a function of visit data issuing means.

The advertisement information providing processing in the fifth embodiment will be discussed in more detail with reference to an operation sequence chart of FIG. 23.

The sequence from step S1201 at which the store 10 of an advertisement client requests the advertisement provider 20 to carry an advertisement and the advertisement information is provided to step S1204 at which the user sets a route in the navigation system NA based on the advertisement information and arrives at the target store 10 as the user is guided by navigation processing is similar to steps S1101 to S1104 of the fourth embodiment shown in FIG. 21. When the advertisement information is displayed and routing is executed in the navigation system NA, for example, advertisement providing data indicating that the advertisement information has been provided, position data based on the GPS, and the like are written into a storage section 309 of the navigation system NA.

The user riding in the vehicle 30 is guided following the routing by the navigation processing of the navigation system NA and arrives at the store 10 or the vicinity thereof, then enters the store 10 and purchases a commodity, etc., (step S1205) The store 10 issues a receipt 350, etc., on which the store code is printed indicating the visit of the user seeing the advertisement to the store to the user and passes the receipt 350, etc., to the user (step S1206). The user enters the store code in the navigation system NA by manual operation or in voice (step S1207). To enter the store code, for example, if the user touches the corresponding store, etc., on the display screen of the display section 307 as a touch panel, specifies the store, etc., through the operation section 306, or presses a dedicated button, the screen is changed to an input screen for transmitting the store code so that the user can use the input screen to enter the store code.

When the store code is entered, the navigation system NA transmits the entered store data together with the position data based on the GPS, the advertisement providing data indicating that the advertisement information has been provided, etc., to the advertisement providing apparatus SP of the advertisement provider 20 by wireless communications through a communication line transmission/reception 310 (step S1208).

The sequence of later steps S1209 to S1212 is similar to steps S1109 to S1112 of the fourth embodiment shown in FIG. 21. When the transmitted visit data is received in the advertisement providing apparatus SP, the advertisement provider 20 requests the store 10 to pay the introduction fee corresponding to the fee of providing the advertisement (step S1209). The store 10 pays the introduction fee to the advertisement provider 20 in response to the request (step S1210) When the visit data is transferred from the navigation system NA to the advertisement providing apparatus SP, the advertisement provider 20 gives some bonus to the user of the navigation system NA in return for providing the visit data (step S1211). The store 10 may transmit discount information at the next using time to the user visiting the store as a bonus (step S1212).

Thus, in the fifth embodiment, the user arrives at the store 10 being advertised as he or she is guided by the navigation system NA and in the store 10, the store code indicating the actual visit of the user seeing the advertisement to the store 10 and contributing to sales is printed on a receipt, etc., and the receipt, etc., is passed to the user, who then enters the store code in the navigation system NA, whereby the store code and the position data are transmitted to the advertisement providing apparatus SP of the advertisement provider 20. Accordingly, the advertisement provider 20 and the store 10 of the advertisement client can totalize the visit data, thereby easily keeping track of the effect of the advertisement, as in the fourth embodiment.

At this time, the store code printed on the receipt, etc., is insignificant for any other person than the user seeing the advertisement information and visiting the store using the navigation system NA and thus a problem of abusing the store code, etc., does not arise. The store 10 needs only to print the store code on the receipt, etc., and pass the receipt, etc., to the user and need not install any special facility or equipment and can save time and effort of user registration, password entry, etc., so that the advertisement information providing system can be easily constructed, introduced and operated.

The user transmits the advertisement providing data indicating that the advertisement information has been provided and the position data based on the GPS of the navigation system NA together with the store code acquired by the user going to the store being advertised, whereby it proves that reliably the user has seen the advertisement and visited the store corresponding thereto, so that the data can be prevented from being abused or tampered and the reliability of the system can be enhanced. Further, if history information at the guiding time by navigation processing, the ID information of the user of the navigation system NA, and the like are transmitted, the reliability of the visit data can be more enhanced.

The introduction fee of the advertisement is paid as the user transmits the visit data, whereby the store can pay the advertisement charge responsive to the advertisement effect, and the advertisement charge when an advertisement is requested to be carried can be reduced and it is made possible to pay the reasonable advertisement charge as much as the actual advertisement effect provided after the advertisement is carried, so that carrying an advertisement excellent in cost effectiveness can be accomplished. The advertisement provider can collect the proper advertisement charge responsive to the effect of attracting customers relative to the advertisement and administrate the information providing service.

A bonus such as a reduction in the communication charge, the use charge, etc., is given to the user in response to transmission of the visit data, whereby the user can get beneficial information and value and thus user's willingness to provide the visit data can be enhanced and the information of the advertisement effect in more conformity with the real state can be collected.

Thus, according to the first and fifth embodiments described above, the advertisement information providing system advantageous for the three parties of the advertisement client, the advertisement provider, and the user can be constructed.

As a modification of the embodiments described above, if a portable information terminal or a mobile telephone capable of conducting wireless or wired communications is used in place of the memory card or the receipt for transferring visit data and the user visits a store with the portable information terminal or the mobile telephone for receiving visit data from the store equipment ST and transferring the visit data to the navigation system NA, the embodiments described above can also be applied. In this case, more preferably a radio signal is transmitted and received to and from the store equipment ST and the navigation system NA by communications of Bluetooth, etc., for transferring the visit data, so that the administration and operation in the practical use are simplified.

To use a portable terminal as the navigation system NA, the user can also bring the portable terminal as the navigation system NA directly to the store equipment ST for receiving visit data and transmitting the visit data to the advertisement providing apparatus SP, in which case the memory card, etc., can be omitted.

In the modifications, to acquire the visit data with a portable terminal, history information, route information, and the like resulting from routing and guiding by navigation processing are received from the navigation system NA by communications of Bluetooth, etc., and are transmitted to the store equipment ST and if the portable terminal contains a navigation function, are transmitted from the machine to the store equipment ST and the visit data is received accordingly. Alternatively, the user presses a predetermined button of a portable terminal, whereby the history information, the route information, and the like of navigation processing are displayed on a screen and the user shows the screen of the portable terminal for the store, whereby the user can also receive a receipt, etc., with the store code printed as the visit data. The visit data is transmitted from the navigation system NA or the portable terminal to the advertisement providing apparatus SP, payment of the introduction fee of the advertisement is conducted between the store and the advertisement provider, and a bonus is given to the user transmitting the visit data.

In the modification, the store clearly knows that the user visits the store as a result of route search and routing based on the advertisement information and thus it is made possible for the store to accurately keep track of the number of the persons visiting the store based on the advertisement and the advertisement effect.

described above, in the invention, when user visits the store corresponding to the information based on the information source published by the advertisement provider, the store pays the cooperation money to the advertisement provider, so that the store knows the advertisement effect and the advertisement provider can get the running cost of the business and further the user is relieved of burdensome navigation operation.

The system is reasonable for the store because the store pays the cooperation money to the advertisement provider in response to the number of persons reading the information magazine or the information terminal and actually visiting the store. The advertisement provider can get enormous running cost as an income by carrying advertisements of a large number of stores and the income can be passed to the advertisement charge, so that it is made possible to set a comparatively low advertisement charge.

Therefore, for a small store formerly unable to carry an advertisement in an information magazine because of a high advertisement charge, it is also made possible to carry an advertisement of the store affordably. Further, the general user is relieved of burdensome navigation operation and it is also possible that the identification number entered in an information magazine is converted into a bar code and a bar code read function is added to a portable information terminal for automatically reading the bar code or a digital camera is attached to a portable information terminal for recognizing the identification number as an image. In doing so, operability can be improved still more.

As described above, according to the invention, it is made possible for the advertisement client of a store, etc., to easily know the advertisement effect of attracting customers to the advertisement object.

According to the invention, the expense responsive to the advertisement effect can be billed and paid and it is made possible to carry an advertisement with excellent cost effectiveness.

What is claimed is:

1. An advertisement information providing system comprising:
    a store apparatus in a store which sends a request to provide advertisement information;
    an advertisement providing apparatus for managing the advertisement information requested by the store apparatus, the advertisement information comprising a store identification number assigned for the store corresponding to latitude and longitude information associated with the store;
    a mobile unit used by a user; and
    a navigation device for guiding the mobile unit,
    wherein the advertisement providing apparatus comprises:
        a provider for providing the advertisement information for the user; and
        a receiver for receiving an arrival notification signal sent from the navigation device,
    wherein the navigation device comprises:
        an input section for inputting the advertisement information;
        a guide section for guiding a mobile unit to the corresponding store based on the advertisement information; and
        a first transmitter for transmitting the arrival notification signal to the advertisement providing apparatus when the mobile unit arrives at a location in a predetermined area containing the store, the arrival notification signal including information based on the store identification number,
    wherein the store apparatus processes a billing signal transmitted by the advertisement providing apparatus based on a user visit identified by the transmitted arrival notification signal.

2. The advertisement information providing system as claimed in claim 1, wherein the store identification number in the advertisement information contains geometrical position information of the store.

3. The advertisement information providing system as claimed in claim 2, wherein the navigation device further comprises an extraction section for extracting geometrical position information from the advertisement information, and wherein
    the guide section guides the mobile unit based on the geometrical position information extracted by the extraction section.

4. The advertisement information providing system as claimed in claim 1, wherein the store identification number in the advertisement information contains a code number assigned uniquely to the advertisement providing apparatus.

5. The advertisement information providing system as claimed in claim 4, wherein the navigation device further comprises an extraction section for extracting the code number from the advertisement information, and
    wherein the first transmitter sends the arrival notification signal to the advertisement providing apparatus corresponding to the extracted code number based on the code number.

6. The advertisement information providing system as claimed in claim 1 wherein the provider in the advertisement providing apparatus provides advertising information in a paper medium.

7. The advertisement information providing system as claimed in claim 1 wherein the provider in the advertisement providing apparatus is an advertisement information terminal storing the advertisement information.

8. The advertisement information providing system as claimed in claim 7, further comprising a portable information terminal for inputting the advertisement information, the portable information terminal comprising:
    an acquisition section for acquiring the advertisement information from the advertisement information terminal; and
    a second transmitter for transmitting the advertisement information to the navigation device.

9. The advertisement information providing system as claimed in claim 8, wherein the store apparatus comprises a first electronic payment section and a third transmitter;

the portable information terminal comprises a second electronic payment section; and when the first electronic payment section in the store apparatus and the second electronic payment section in the portable information terminal communicate with each other for conducting electronic payment, one of the third transmitter of the store apparatus and the second transmitter of the portable information terminal sends a purchase notification signal to the advertisement providing apparatus.

10. A navigation device for guiding a mobile unit based on advertisement information published by an advertisement providing apparatus for managing the advertisement information requested by a store apparatus in a store, the advertisement information comprising a store identification number assigned for the store corresponding to latitude and longitude information associated with the store, the navigation terminal comprising:

an input section for inputting the advertisement information;

a guide section for guiding a mobile unit to a corresponding store based on the advertisement information; and a transmitter for transmitting an arrival notification signal to the advertisement providing apparatus when the mobile unit arrives at a location in a predetermined area containing the store, the arrival notification signal including information based on the store identification number, the store apparatus processing a billing signal transmitted by the advertisement providing apparatus based on a user visit identified by the transmitted arrival notification signal.

11. The navigation device as claimed in claim 10 wherein the advertisement information comprises only the store identification number assigned for the store.

12. The navigation device as claimed in claim 11 further comprising an extraction section for extracting the geometrical position information from the store identification number, wherein the guide section guides the mobile unit based on the geometrical position information in the store identification number.

13. The navigation device as claimed in claim 11 further comprising an extraction section for extracting the geometrical position information from the advertisement information, wherein the guide section guides the mobile unit based on the geometrical position information in the store identification number.

14. A record medium storing a program to be executed in a navigation device, the program comprising:

guiding a mobile unit to a store based on identification information in advertisement information published by an advertisement providing apparatus for managing the advertisement information requested by a store apparatus in a store, the advertisement information comprising a store identification number assigned for the store corresponding to latitude and longitude information associated with the store; and transmitting an arrival notification signal to the advertisement providing apparatus when the mobile unit arrives at a location in a predetermined area containing the store, the arrival notification signal including information based on the store identification number, the store apparatus processing a billing signal transmitted by the advertisement providing apparatus based on a user visit identified by the transmitted arrival notification signal.

15. The record medium as claimed in claim 14, the program further comprising:

terminating the program when the arrival notification signal is sent in the sending step.

16. An information terminal used with an advertisement information providing system, the information terminal comprising:

a guide section which guides a mobile unit used by a user to an advertisement object location of a store having a store apparatus based on advertisement information provided by an advertisement providing apparatus; and a visit data transmitter for transmitting to the advertisement providing apparatus distributing the advertisement information actual visit data obtained from an advertisement object location when the mobile unit arrives at a location in a predetermined geographic range containing the advertisement object location as guided by the guide section, wherein the actual visit data is based on the advertisement information provided by the advertisement providing apparatus, and wherein the store apparatus processes a billing signal transmitted by the advertisement providing apparatus based on the transmitted actual visit data.

17. The information terminal as claimed in claim 16, further comprising an advertisement showing section for displaying the provided advertisement information on a screen or audibly communicating the provided advertisement information, wherein the visit data transmitter transmits advertisement providing data indicating that the corresponding advertisement information has been provided by the advertisement showing section to the advertisement providing apparatus together with the actual visit data.

18. The information terminal as claimed in claim 16, wherein the guide section sets a route based on the advertisement information and guides the mobile unit into the advertisement object location.

19. The information terminal as claimed in claim 16, wherein the visit data transmission section transmits position data when the mobile unit arrives at a location in the predetermined geographic range containing the advertisement object location to the advertisement providing apparatus together with the actual visit data.

20. The information terminal as claimed in claim 16, further comprising a portable memory card attachable to and detachable from the information terminal, the portable memory for recording the actual visit data, wherein when the memory card on which the actual visit data is recorded is attached to the information terminal, the actual visit data transmitter transmits the visit data to the advertisement providing apparatus.

21. The information terminal as claimed in claim 16, further comprising a data input section for entering an advertisement object code obtained from the advertisement object as the actual visit data, wherein when the advertisement object code is entered, the visit data transmitter transmits position data to the advertisement providing apparatus together with the advertisement object code.

22. An advertisement information providing system comprising:

a store apparatus which sends a request to provide an advertisement information;

an advertisement providing apparatus for providing the advertisement information;

a mobile unit used by a user; and an information terminal for guiding the mobile unit into an advertisement object location based on the provided advertisement information, wherein the advertisement providing apparatus comprises:
a billing section;
an advertisement distribution section for distributing advertisement information; and
a receiver for receiving a signal transmitted from the information terminal, wherein the information terminal comprises:
a guide section for guiding the mobile unit into the advertisement object location based on the distributed advertisement information; and
a visit data transmission section for transmitting to the advertisement providing apparatus distributing the advertisement information actual visit data, when the mobile unit arrives at a location in a predetermined geographic range containing the advertisement object location as guided by the guide section,
wherein the billing section requests an advertisement client of the advertisement object to pay an introduction fee when the advertisement providing apparatus receives the actual visit data from the information terminal,
wherein the actual visit data is based on the advertisement information provided by the advertisement providing apparatus.

23. The advertisement information providing system as claimed in claim 22, wherein the advertisement providing apparatus further comprises:
a bonus giving section, if the advertisement providing apparatus receives the actual visit data from the information terminal, for giving a bonus to a user of the information terminal as the user provides the actual visit data.

24. The advertisement information providing system as claimed in claim 22, further comprising an advertisement client apparatus managed by an advertisement client of the advertisement object,
wherein the advertisement client apparatus comprises a visit data transmitter for sending the actual visit data to a portable memory card attachable to and detachable from the information terminal for recording the actual visit data,
when the memory card on which the actual visit data is recorded is attached to the information terminal, the visit data transmission section of the information terminal transmits the actual visit data to the advertisement providing apparatus.

25. The advertisement information providing system as claimed in claim 22, further comprising an advertisement client apparatus managed by an advertisement client of the advertisement object,
wherein the advertisement client apparatus comprises:
a visit data issuing section for issuing an advertisement object code containing information concerning at least either of the advertisement object and the advertisement itself as the actual visit data,
the information terminal further comprises a data input section for entering the issued advertisement object code.

* * * * *